US012705509B2

(12) United States Patent
Chung et al.

(10) Patent No.: US 12,705,509 B2
(45) Date of Patent: Aug. 11, 2026

(54) DISPLAY CONTROL SYSTEM, DISPLAY CONTROL METHOD, AND INFORMATION STORAGE MEDIUM

(71) Applicant: RAKUTEN GROUP, INC., Tokyo (JP)

(72) Inventors: YoungJoo Chung, San Mateo, CA (US); Rohan Kumar, San Mateo, CA (US)

(73) Assignee: RAKUTEN GROUP, INC., Tokyo (JP)

( * ) Notice: Subject to any disclaimer, the term of this patent is extended or adjusted under 35 U.S.C. 154(b) by 152 days.

(21) Appl. No.: 18/539,210

(22) Filed: Dec. 13, 2023

(65) Prior Publication Data

US 2024/0211776 A1 Jun. 27, 2024

Related U.S. Application Data

(60) Provisional application No. 63/435,330, filed on Dec. 26, 2022.

(51) Int. Cl.

| | |
|---|---|
| ***G06N 5/022*** | (2023.01) |
| ***G06F 9/451*** | (2018.01) |
| ***G06F 40/20*** | (2020.01) |
| ***G06Q 30/0282*** | (2023.01) |

(52) U.S. Cl.

CPC ............. *G06N 5/022* (2013.01); *G06F 9/451* (2018.02); *G06F 40/20* (2020.01); *G06Q 30/0282* (2013.01)

(58) Field of Classification Search

CPC ......... G06N 5/022; G06F 9/451; G06F 40/20; G06Q 30/0282

See application file for complete search history.

(56) References Cited

U.S. PATENT DOCUMENTS

| | | | | |
|---|---|---|---|---|
| 10,198,499 | B1 * | 2/2019 | McNair | G16H 15/00 |
| 10,616,657 | B1 * | 4/2020 | Wang | H04N 21/251 |
| 2011/0173191 | A1 * | 7/2011 | Tsaparas | G06F 16/313 707/E17.084 |
| 2015/0326708 | A1 * | 11/2015 | Ginzburg | G06Q 50/01 715/752 |
| 2021/0319780 | A1 * | 10/2021 | Aher | G10L 13/0335 |
| 2022/0122134 | A1 * | 4/2022 | Hoffman | G06N 20/00 |
| 2024/0232954 | A1 * | 7/2024 | Gardyne | G11B 27/031 |

FOREIGN PATENT DOCUMENTS

| | | | |
|---|---|---|---|
| JP | 2021012645 | A | 2/2021 |
| JP | 7003088 | B2 | 1/2022 |

OTHER PUBLICATIONS

Office Action of Dec. 3, 2024, for corresponding JP Patent Application No. 2023-207922 with English translation, pp. 1-8.

* cited by examiner

*Primary Examiner* — Andrea C Leggett

(74) *Attorney, Agent, or Firm* — HEA Law PLLC

(57) ABSTRACT

Provided is a display control system including at least one processor, the at least one processor being configured to: acquire user characteristics information about characteristics of a user; select, based on the user characteristics information, from among text contents which are contents including a letter, partial text contents which are a part of the text contents, without requiring text input from the user; and display the text contents on a display in a manner that makes the partial text contents distinguishable.

19 Claims, 15 Drawing Sheets

| USER ID | USER NAME | REVIEW INFORMATION | | | | |
|---|---|---|---|---|---|---|
| | | REVIEW ID | SHOP ID | BODY OF REVIEW | RATING | POST DATE AND TIME |
| u00001 | USER D | r00001 | s00001 | I'VE BEEN INTERESTED IN ... | 4.0 | 2022/11/20 21:35:42 |
| u00002 | USER E | r00002 | s00001 | I FREQUENT THIS SHOP ... | 5.0 | 2022/11/22 12:05:15 |
| u00003 | USER F | r00003 | s00001 | WENT AT THE LUNCH TIME ... | 3.0 | 2022/11/25 16:12:56 |
| u00004 | USER C | r00004 | s00002 | A NEW SHOP IN THE NEIGHBORHOOD ... | 3.5 | 2022/11/25 18:02:21 |
| ⋮ | ⋮ | ⋮ | ⋮ | ⋮ | ⋮ | ⋮ |

| SHOP ID | URL | TEXT CONTENTS INFORMATION | | | | |
|---|---|---|---|---|---|---|
| | | REVIEW ID | POSTER | BODY OF REVIEW | RATING | POST DATE AND TIME |
| s00001 | URL1 | r00001 | u00001 | I'VE BEEN INTERESTED IN ... | 4.0 | 2022/11/20 21:35:42 |
| | | r00002 | u00002 | I FREQUENT THIS SHOP ... | 5.0 | 2022/11/22 12:05:15 |
| | | r00003 | u00003 | WENT AT THE LUNCH TIME ... | 3.0 | 2022/11/25 16:12:56 |
| | | . . . | . . . | . . . | . . . | . . . |
| s00002 | URL2 | r00004 | u00004 | A NEW SHOP IN THE NEIGHBORHOOD ... | 3.5 | 2022/11/25 18:02:21 |
| | | . . . | . . . | . . . | . . . | . . . |
| . . . | . . . | . . . | . . . | . . . | . . . | . . . |

| CLUSTER ID | CLUSTER NAME | CANDIDATE EXPRESSIONS |
|---|---|---|
| C1 | TASTE | SOY SAUCE |
| | | HEAVY |
| | | LIGHT |
| | | ... |
| C2 | PRICE | INEXPENSIVE |
| | | EXPENSIVE |
| | | COST PERFORMANCE |
| | | ... |
| C3 | ATMOSPHERE | STYLISH |
| | | CLEAN |
| | | BUSTLING |
| | | ... |
| ... | ... | ... |

| TRAINING DATA | | |
|---|---|---|
| INPUT PART | OUTPUT PART | |
| COMBINED TRAINING EXPRESSION | CLUSTER | LABEL |
| TRAINING REVIEW EXPRESSION OF USER D + TRAINING CONTENTS EXPRESSION | C1 (TASTE) | 1 |
| | C2 (PRICE) | 1 |
| | C3 (ATMOSPHERE) | 0 |
| | C4 (ACCESS) | 0 |
| | ... | ... |
| TRAINING REVIEW EXPRESSION OF USER E + TRAINING CONTENTS EXPRESSION | C1 (TASTE) | 1 |
| | C2 (PRICE) | 1 |
| | C3 (ATMOSPHERE) | 0 |
| | C4 (ACCESS) | 0 |
| | ... | ... |
| TRAINING REVIEW EXPRESSION OF USER F + TRAINING CONTENTS EXPRESSION | C1 (TASTE) | 1 |
| | C2 (PRICE) | 0 |
| | C3 (ATMOSPHERE) | 1 |
| | C4 (ACCESS) | 0 |
| | ... | ... |
| ... | ... | |

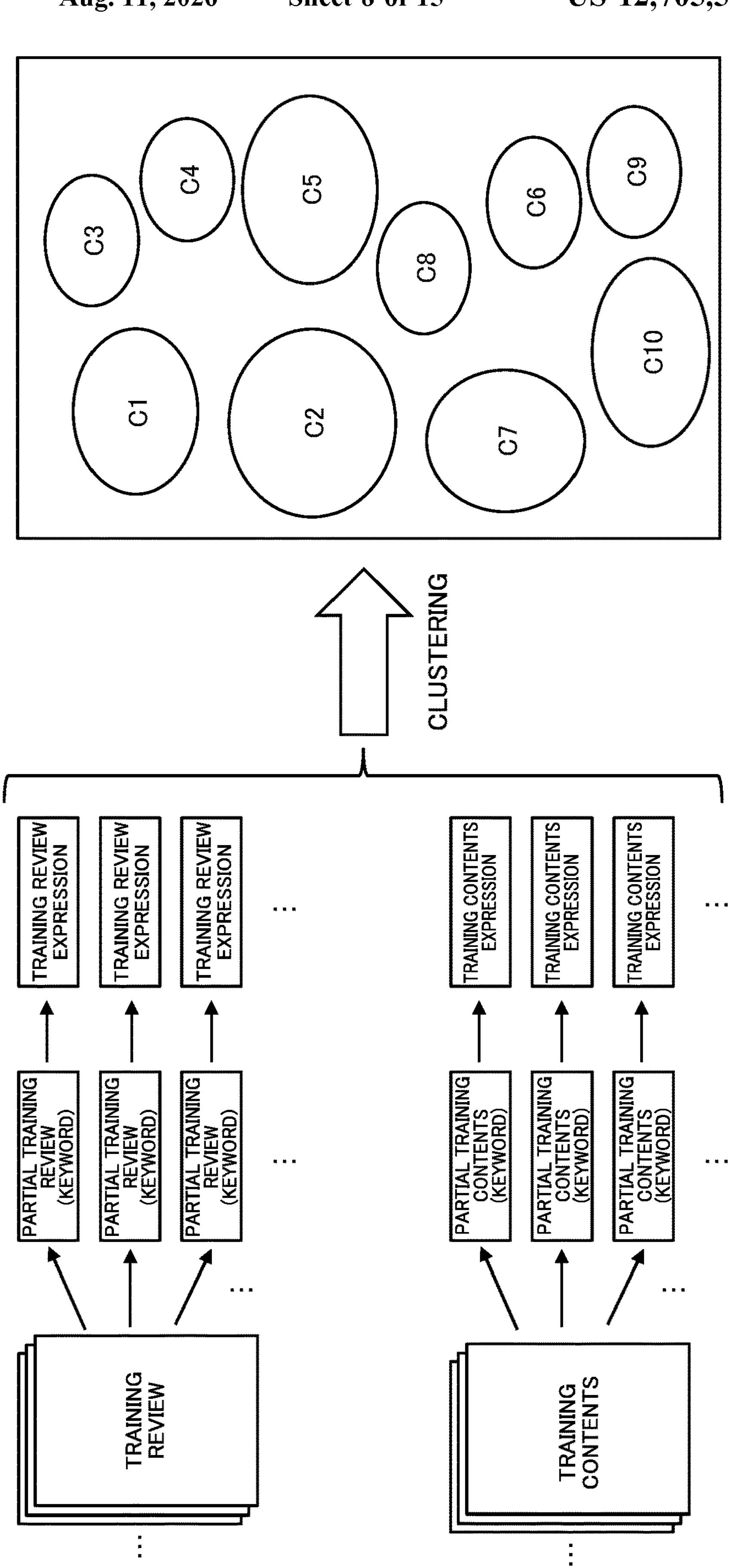
FIG.8
TRAINING REVIEW
PARTIAL TRAINING REVIEW (KEYWORD)
PARTIAL TRAINING REVIEW (KEYWORD)
PARTIAL TRAINING REVIEW (KEYWORD)
TRAINING REVIEW EXPRESSION
TRAINING REVIEW EXPRESSION
TRAINING REVIEW EXPRESSION
TRAINING CONTENTS
PARTIAL TRAINING CONTENTS (KEYWORD)
PARTIAL TRAINING CONTENTS (KEYWORD)
PARTIAL TRAINING CONTENTS (KEYWORD)
TRAINING CONTENTS EXPRESSION
TRAINING CONTENTS EXPRESSION
TRAINING CONTENTS EXPRESSION
CLUSTERING
C1
C2
C3
C4
C5
C6
C7
C8
C9
C10

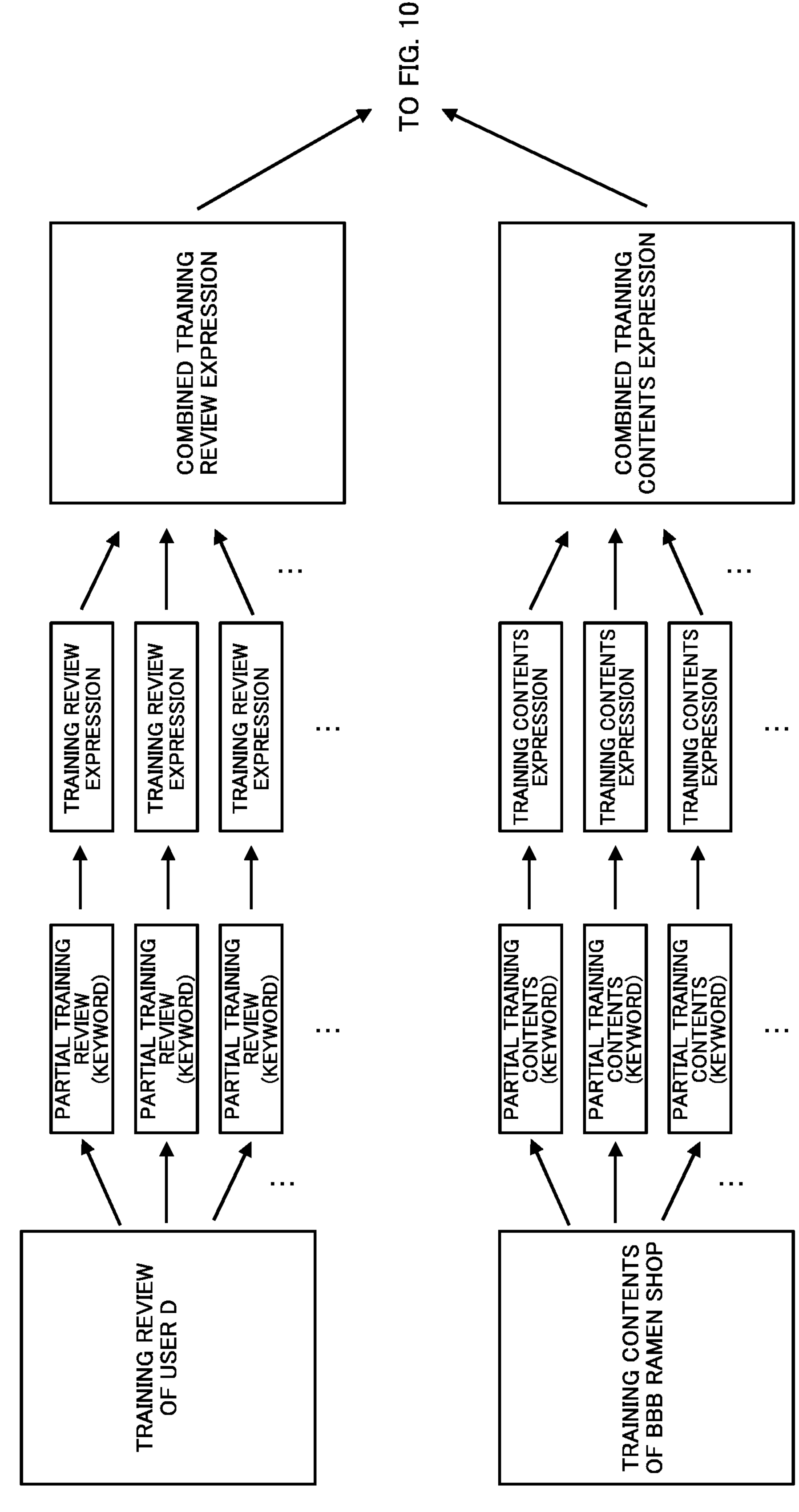
FIG.9
TRAINING REVIEW OF USER D
PARTIAL TRAINING REVIEW (KEYWORD)
PARTIAL TRAINING REVIEW (KEYWORD)
PARTIAL TRAINING REVIEW (KEYWORD)
TRAINING REVIEW EXPRESSION
TRAINING REVIEW EXPRESSION
TRAINING REVIEW EXPRESSION
COMBINED TRAINING REVIEW EXPRESSION
TRAINING CONTENTS OF BBB RAMEN SHOP
PARTIAL TRAINING CONTENTS (KEYWORD)
PARTIAL TRAINING CONTENTS (KEYWORD)
PARTIAL TRAINING CONTENTS (KEYWORD)
TRAINING CONTENTS EXPRESSION
TRAINING CONTENTS EXPRESSION
TRAINING CONTENTS EXPRESSION
COMBINED TRAINING CONTENTS EXPRESSION
TO FIG. 10

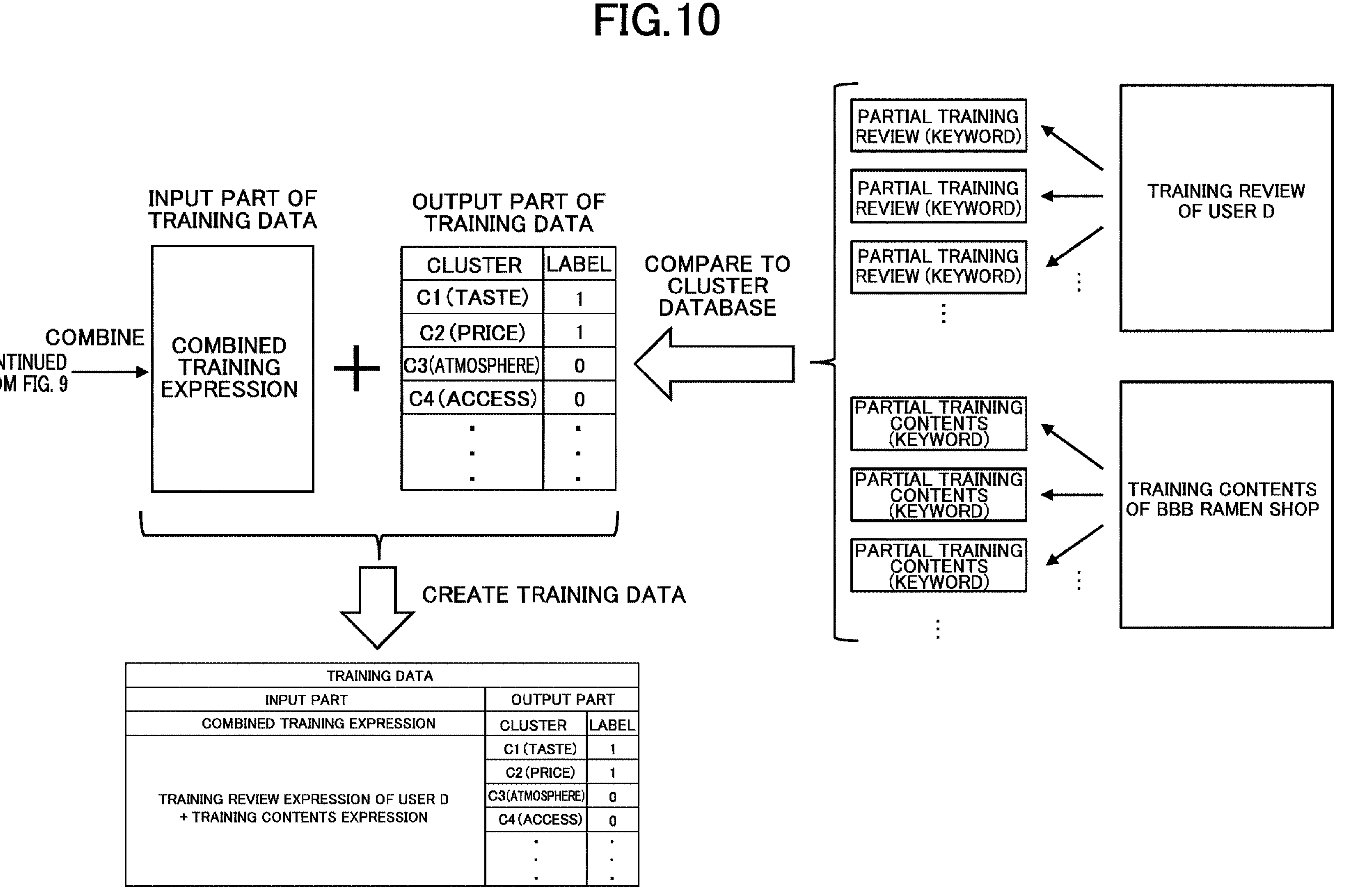
FIG.10
TRAINING REVIEW OF USER D
TRAINING CONTENTS OF BBB RAMEN SHOP
PARTIAL TRAINING REVIEW (KEYWORD)
PARTIAL TRAINING REVIEW (KEYWORD)
PARTIAL TRAINING REVIEW (KEYWORD)
PARTIAL TRAINING CONTENTS (KEYWORD)
PARTIAL TRAINING CONTENTS (KEYWORD)
PARTIAL TRAINING CONTENTS (KEYWORD)
COMPARE TO CLUSTER DATABASE
INPUT PART OF TRAINING DATA
COMBINED TRAINING EXPRESSION
COMBINE
CONTINUED FROM FIG. 9
OUTPUT PART OF TRAINING DATA
CLUSTER
LABEL
C1 (TASTE)
1
C2 (PRICE)
1
C3 (ATMOSPHERE)
0
C4 (ACCESS)
0
CREATE TRAINING DATA
TRAINING DATA
INPUT PART
OUTPUT PART
COMBINED TRAINING EXPRESSION
CLUSTER
LABEL
TRAINING REVIEW EXPRESSION OF USER D + TRAINING CONTENTS EXPRESSION
C1 (TASTE)
1
C2 (PRICE)
1
C3 (ATMOSPHERE)
0
C4 (ACCESS)
0

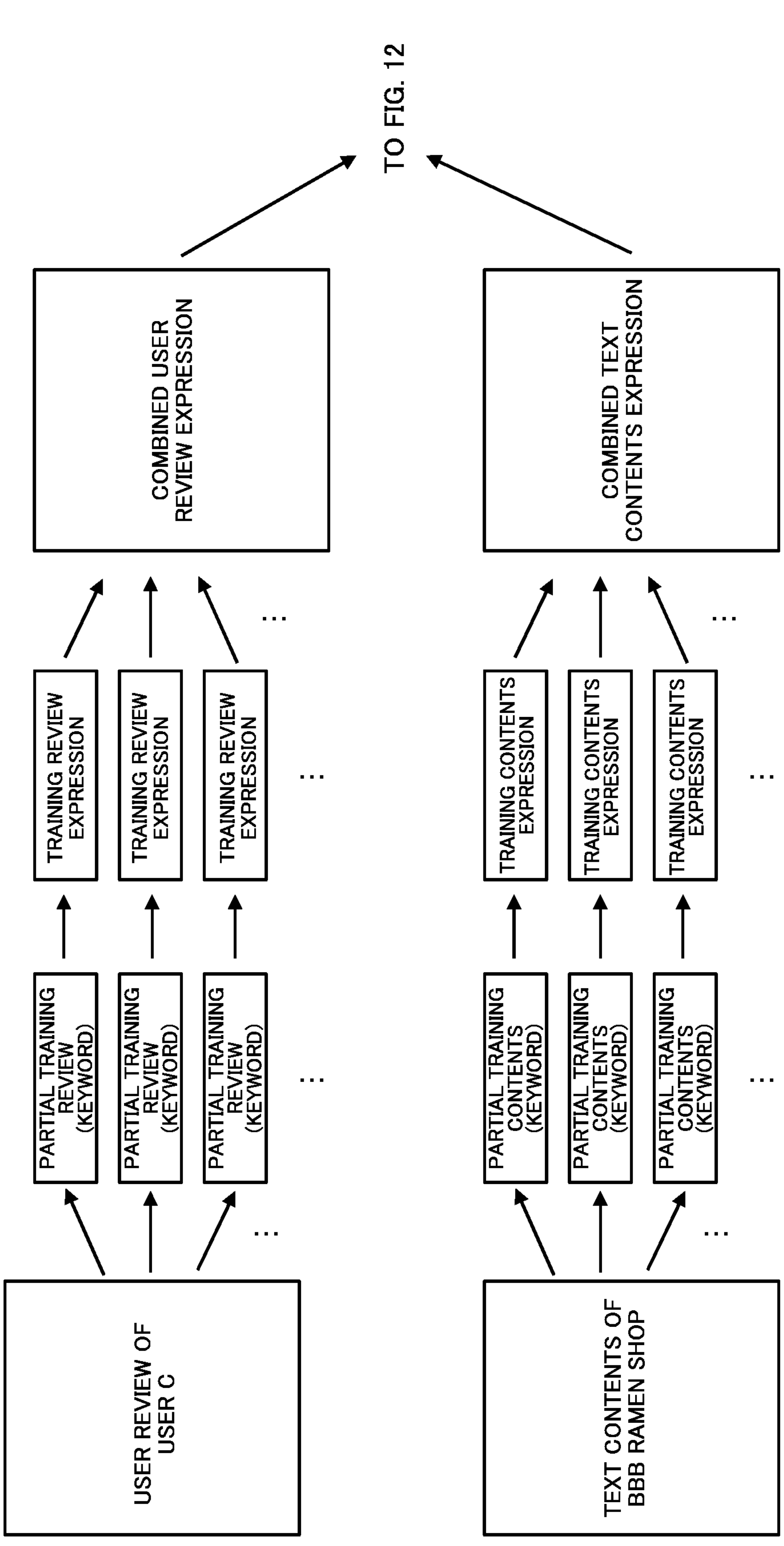
FIG.11
USER REVIEW OF USER C
PARTIAL TRAINING REVIEW (KEYWORD)
PARTIAL TRAINING REVIEW (KEYWORD)
PARTIAL TRAINING REVIEW (KEYWORD)
TRAINING REVIEW EXPRESSION
TRAINING REVIEW EXPRESSION
TRAINING REVIEW EXPRESSION
COMBINED USER REVIEW EXPRESSION
TEXT CONTENTS OF BBB RAMEN SHOP
PARTIAL TRAINING CONTENTS (KEYWORD)
PARTIAL TRAINING CONTENTS (KEYWORD)
PARTIAL TRAINING CONTENTS (KEYWORD)
TRAINING CONTENTS EXPRESSION
TRAINING CONTENTS EXPRESSION
TRAINING CONTENTS EXPRESSION
COMBINED TEXT CONTENTS EXPRESSION
TO FIG. 12

FIG. 12

| CLUSTER | LABEL |
| --- | --- |
| C1 (TASTE) | 80 |
| C2 (PRICE) | 35 |
| C3 (ATMOSPHERE) | 51 |
| C4 (ACCESS) | 12 |
| ... | ... |

| CANDIDATE EXPRESSIONS |
| --- |
| SOY SAUCE |
| HEAVY |
| LIGHT |
| ... |

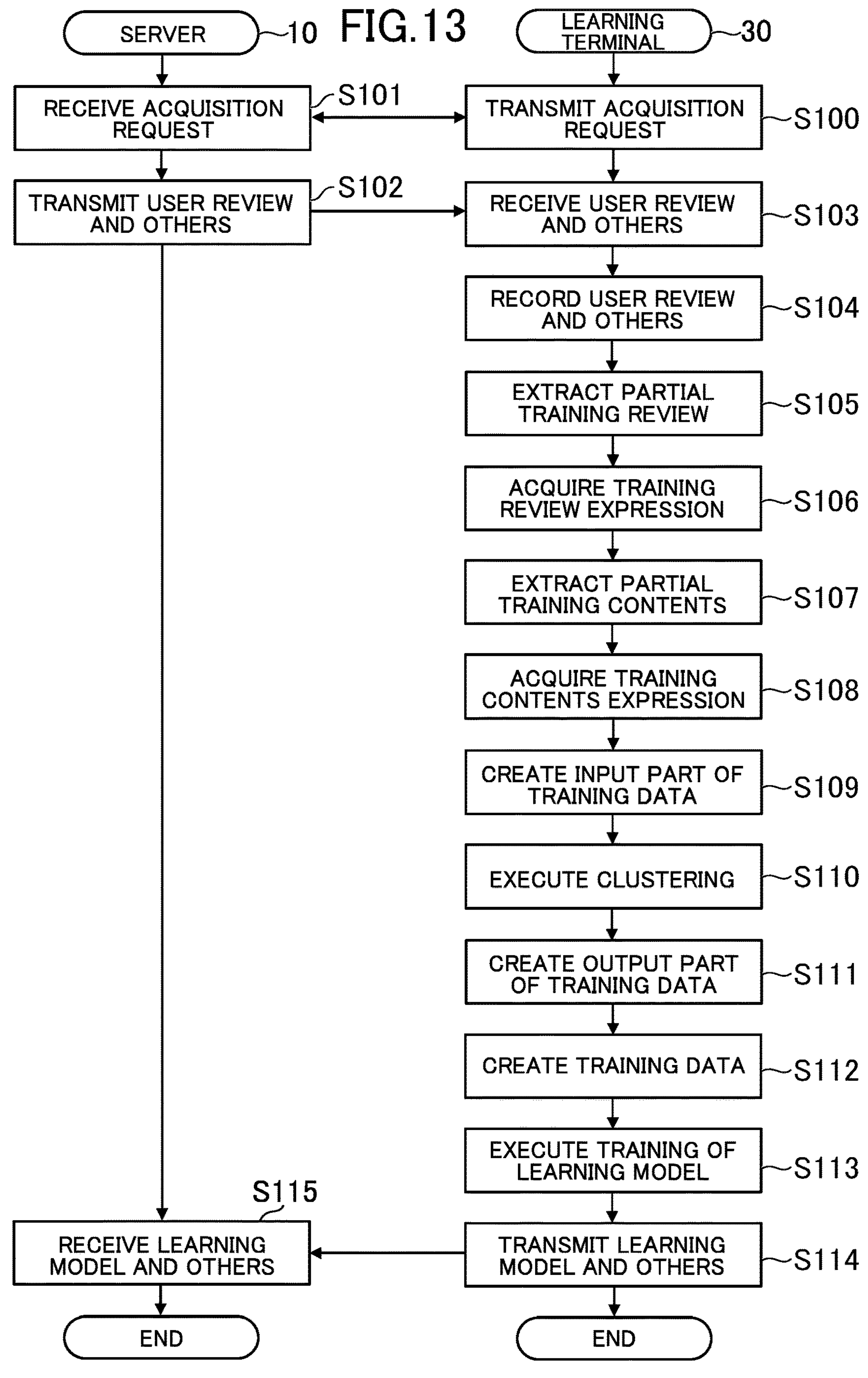
FIG.13
SERVER
10
LEARNING TERMINAL
30
RECEIVE ACQUISITION REQUEST
S101
TRANSMIT ACQUISITION REQUEST
S100
TRANSMIT USER REVIEW AND OTHERS
S102
RECEIVE USER REVIEW AND OTHERS
S103
RECORD USER REVIEW AND OTHERS
S104
EXTRACT PARTIAL TRAINING REVIEW
S105
ACQUIRE TRAINING REVIEW EXPRESSION
S106
EXTRACT PARTIAL TRAINING CONTENTS
S107
ACQUIRE TRAINING CONTENTS EXPRESSION
S108
CREATE INPUT PART OF TRAINING DATA
S109
EXECUTE CLUSTERING
S110
CREATE OUTPUT PART OF TRAINING DATA
S111
CREATE TRAINING DATA
S112
EXECUTE TRAINING OF LEARNING MODEL
S113
S115
RECEIVE LEARNING MODEL AND OTHERS
TRANSMIT LEARNING MODEL AND OTHERS
S114
END
END

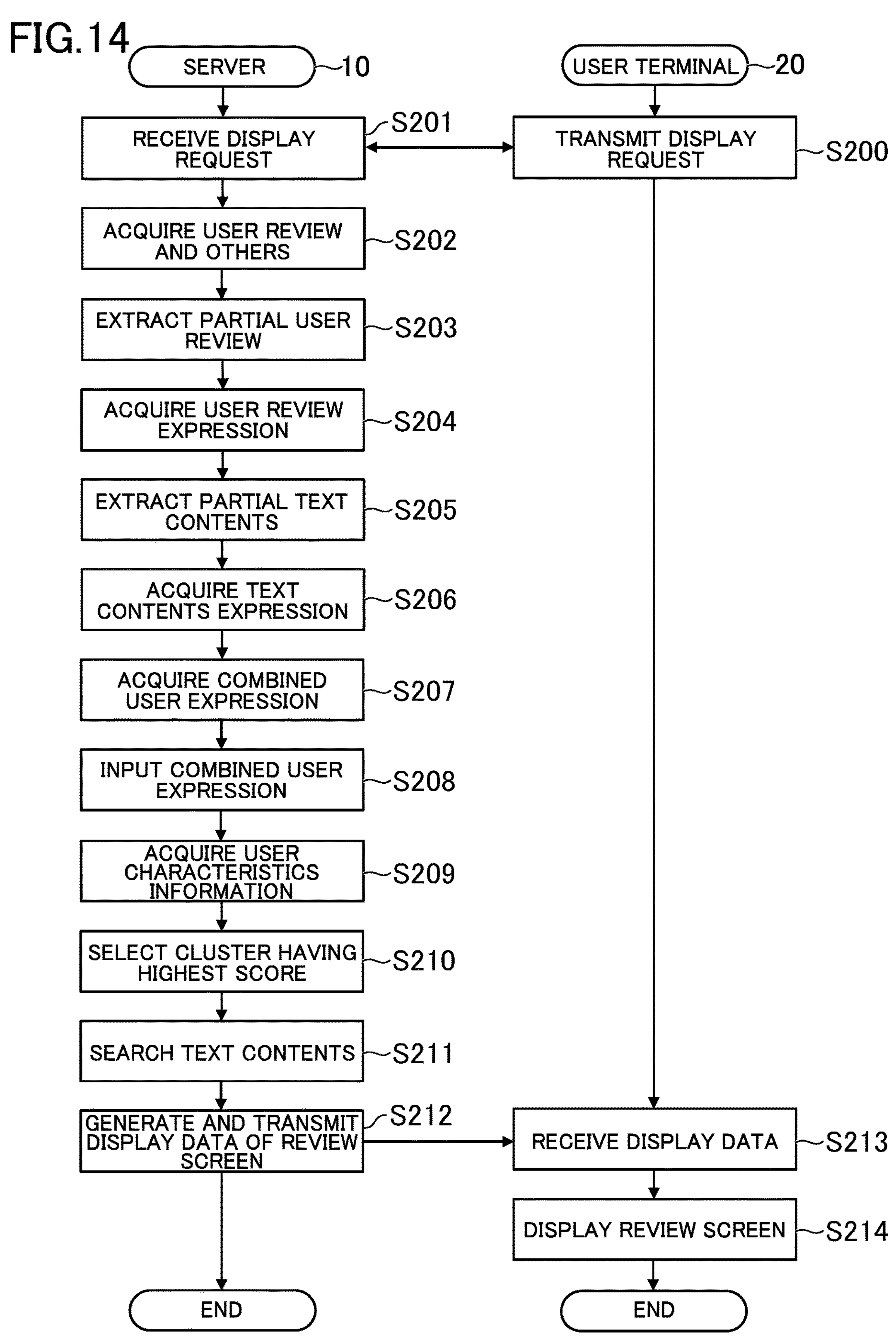
FIG. 14
SERVER
10
USER TERMINAL
20
TRANSMIT DISPLAY REQUEST
S200
RECEIVE DISPLAY REQUEST
S201
ACQUIRE USER REVIEW AND OTHERS
S202
EXTRACT PARTIAL USER REVIEW
S203
ACQUIRE USER REVIEW EXPRESSION
S204
EXTRACT PARTIAL TEXT CONTENTS
S205
ACQUIRE TEXT CONTENTS EXPRESSION
S206
ACQUIRE COMBINED USER EXPRESSION
S207
INPUT COMBINED USER EXPRESSION
S208
ACQUIRE USER CHARACTERISTICS INFORMATION
S209
SELECT CLUSTER HAVING HIGHEST SCORE
S210
SEARCH TEXT CONTENTS
S211
GENERATE AND TRANSMIT DISPLAY DATA OF REVIEW SCREEN
S212
RECEIVE DISPLAY DATA
S213
DISPLAY REVIEW SCREEN
S214
END
END

DISPLAY CONTROL SYSTEM, DISPLAY CONTROL METHOD, AND INFORMATION STORAGE MEDIUM

CROSS-REFERENCE TO RELATED APPLICATION

The present application claims priority from the U.S. provisional application No. 63/435,330, filed on Dec. 26, 2022, the disclosures of which are incorporated by reference herein.

BACKGROUND OF THE INVENTION

1. Field of the Invention

The present disclosure relates to a display control system, a display control method, and an information storage medium.

2. Description of the Related Art

There has hitherto been known a technology for controlling display of text contents, which are contents including letters. In Japanese Patent No. 7,003,088, for example, a website is given as an example of text contents. The technology of Japanese Patent No. 7,003,088 involves estimation of correlation between text contents based on a browsing history of each of a plurality of text contents and on the degree of match between attributes of the text contents. With the technology of Japanese Patent No. 7003088, text contents are proposed to a user based on the estimated correlation.

However, although the technology of Japanese Patent No. 7003088 can propose text contents that are likely to interest the user, the user is required to search with his or her own eyes for parts that pique the user's interest from among the text contents. For example, the user may input a search word to search for in the text contents from a menu of a browser but, it is a hassle for the user to manually input a search word. The related art accordingly falls short of raising user-friendliness to a satisfactory level.

SUMMARY OF THE INVENTION

One object of the present disclosure is to raise user-friendliness.

According to the present disclosure, there is provided a display control system including at least one processor, the at least one processor being configured to: acquire user characteristics information about characteristics of a user; select, based on the user characteristics information, from among text contents which are contents including a letter, partial text contents which are a part of the text contents, without requiring text input from the user; and display the text contents on a display in a manner that makes the partial text contents distinguishable.

BRIEF DESCRIPTION OF THE DRAWINGS

FIG. 4 is a table for showing an example of a user database.

FIG. 5 is a table for showing an example of a text content database.

FIG. 6 is a table for showing an example of a cluster database.

FIG. 7 is a table for showing an example of a training database.

FIG. 8 is a diagram for illustrating an example of a flow of clustering.

FIG. 9 is a diagram for illustrating an example of a flow of creating training data.

FIG. 10 is a diagram for illustrating the example of the flow of creating the training data.

FIG. 11 is a diagram for illustrating an example of processing of acquiring user characteristics information with use of a learning model.

FIG. 12 is a diagram for illustrating the example of the processing of acquiring the user characteristics information with the use of the learning model.

FIG. 13 is a diagram for illustrating an example of learning processing.

FIG. 14 is a diagram for illustrating an example of display control processing.

DETAILED DESCRIPTION OF THE INVENTION

1. Overall Configuration of Display Control System

Figure 1:
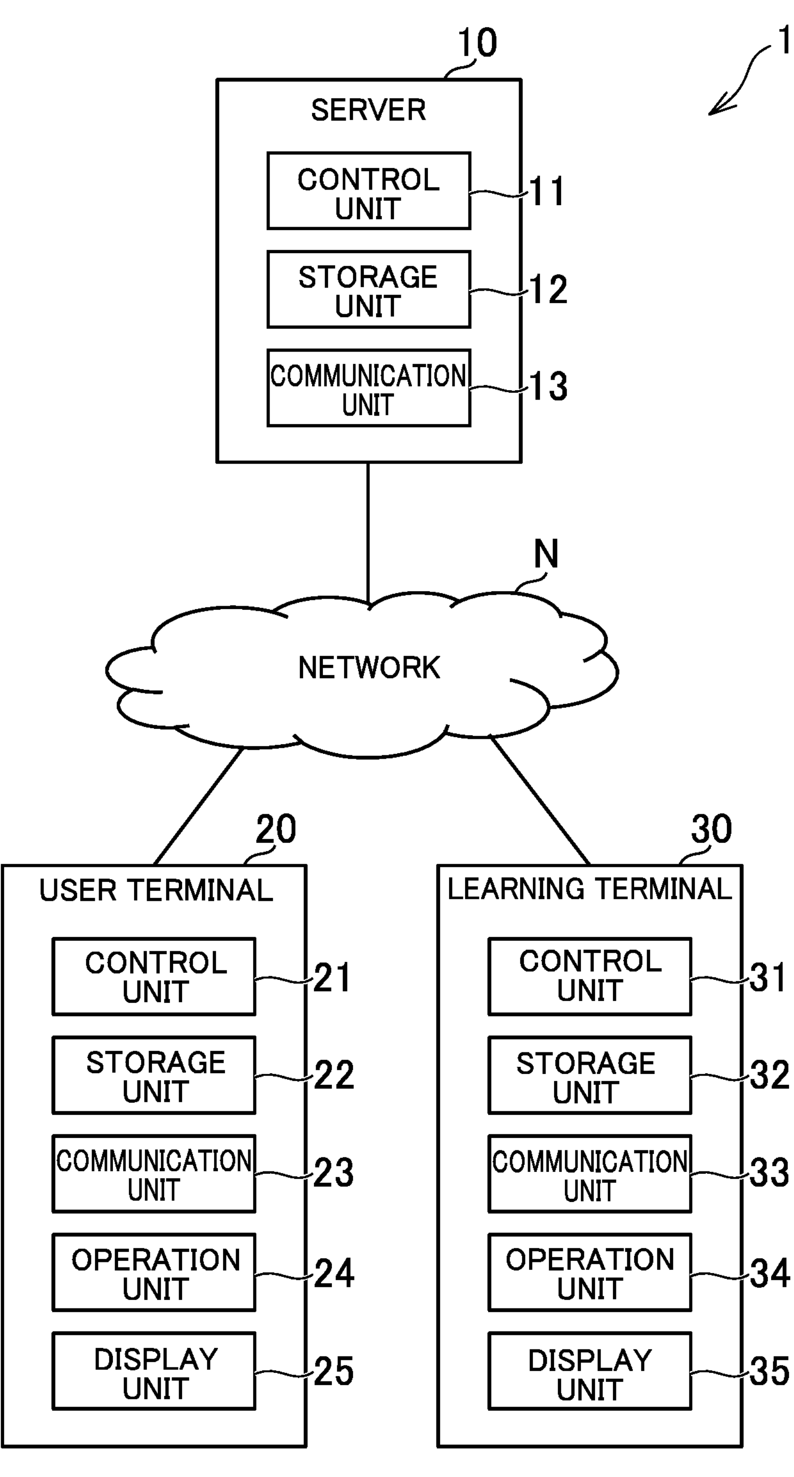
FIG. 1 is a diagram for illustrating an example of an overall configuration of a display control system.

An example of an embodiment of a display control system according to the present disclosure is described. FIG. 1 is a diagram for illustrating an example of an overall configuration of the display control system. For example, a display control system 1 includes a server 10, a user terminal 20, and a learning terminal 30. The server 10, the user terminal 20, and the learning terminal 30 are each connected to a network N, such as the Internet or a LAN.

The server 10 is a server computer. For example, the server 10 includes a control unit 11, a storage unit 12, and a communication unit 13. The control unit 11 includes at least one processor. The storage unit 12 includes a volatile memory such as a RAM, and a non-volatile memory such as a flash memory. The communication unit 13 includes at least one of a communication interface for wired communication or a communication interface for wireless communication.

The user terminal 20 is a computer of a user. For example, the user terminal 20 is a personal computer, a tablet terminal, a smartphone, or a wearable terminal. For example, the user terminal 20 includes a control unit 21, a storage unit 22, a communication unit 23, an operation unit 24, and a display unit 25. The control unit 21, the storage unit 22, and the communication unit 23 may have the same physical configurations as physical configurations of the control unit 11, the storage unit 12, and the communication unit 13, respectively. The operation unit 24 is an input device, such as a keyboard, a mouse, or a touch panel. The display unit 25 is a display, such as a liquid crystal display or an organic EL display.

The learning terminal 30 is a computer on which learning described below is executed. The learning terminal 30 is, for example, a personal computer, a tablet terminal, or a smartphone. The learning terminal 30 includes, for example, a control unit 31, a storage unit 32, a communication unit 33, an operation unit 34, and a display unit 35. The control unit 31, the storage unit 32, the communication unit 33, the operation unit 34, and the display unit 35 may have the same physical configurations as physical configurations of the control unit 11, the storage unit 12, the communication unit 13, the operation unit 24, and the display unit 25, respectively.

Programs stored in the storage units 12, 22, and 32 may be provided via the network N. Alternatively, programs stored on computer-readable information storage media may be provided via reading units (for example, optical disc drives or memory card slots) which read information storage media, or input-and-output units (for example, USB ports) for inputting and outputting data to and from external devices.

It is sufficient for the display control system 1 to include at least one computer, and the display control system 1 is not limited to the example of FIG. 1. For instance, the display control system 1 may include the server 10 alone without including the user terminal 20 and the learning terminal 30. The display control system 1 may include the user terminal 20 alone without including the server 10 and the learning terminal 30. The display control system 1 may include a computer other than the server 10, the user terminal 20, and the learning terminal 30.

2. Outline of the Display Control System

In this embodiment, the display control system 1 controls display of text contents. Text contents are contents including at least one letter. Contents are information provided by an electronic measure. Text contents are, for example, a website, a screen displayed on an application other than a browser, a document file, a rich text file, or a plain text file. Text contents may include letters alone or information other than letters (for example, a still image, a moving image, or a sound).

In this embodiment, a website is described as an example of text contents. As an example of a website, a gourmet site which introduces eating and drinking establishments is described. The website can be of any type and is not limited to a gourmet site. For example, a portal site, a news site, an online shopping site, an online flea market site, a travel reservation site, a video streaming site, an official site of a corporation or the like, and various other sites can be text contents. The text contents can be in any language, for example, English, Japanese, Korean, Chinese, French, or Spanish.

For example, the server 10 is managed by an administrator of the gourmet site. The server 10 stores various types of data about the gourmet site. A user operates the user terminal 20 to access the server 10 and can view various types of information about eating and drinking establishments published on the gourmet site. The user is allowed to post reviews of eating and drinking establishments on the gourmet site. The user can view reviews of eating and drinking establishments posted by other users on the gourmet site. In this embodiment, a review screen which displays reviews of an eating and drinking establishment is taken as an example out of screens of the gourmet site.

Figure 2:
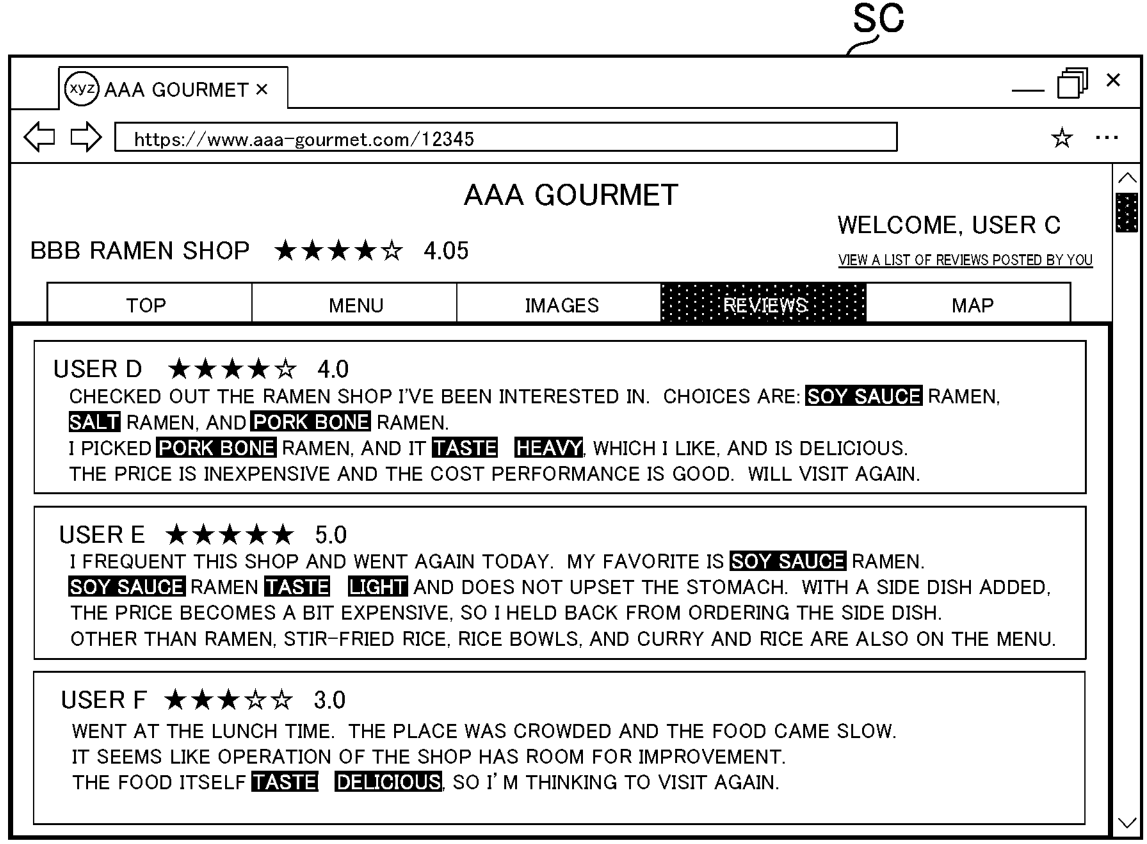
FIG. 2 is a diagram for illustrating an example of a review screen.

FIG. 2 is a diagram for illustrating an example of the review screen. For example, a review screen SC displays reviews of an eating and drinking establishment selected by the user. In a case in which the user has posted a review, the review screen SC displays not only reviews of other users but also the review posted by the user himself or herself. The user operating the user terminal 20 (User C in the example of FIG. 2) is hereinafter referred to as "user." Other users who have posted reviews (User D to User F in the example of FIG. 2) displayed on the screen SC are hereinafter referred to as "posters."

In this embodiment, a part of a review that is likely to interest the user is highlighted. This part is hereinafter referred to as "partial text contents." The partial text contents are a part of text contents. The partial text contents include at least one letter. The partial text contents may be any of one word, a phrase including a plurality of words, and a sentence. An upper limit may or may not be set to the number of letters in the partial text contents.

For example, a case in which the user is interested in taste in reviews of posters, but not in other elements, such as price, atmosphere, and access, is discussed. In this case, as illustrated in FIG. 2, partial text contents indicating taste, such as "soy sauce," "salt," "pork bone," "heavy," "flavor," "light," and "delicious," in the reviews of the posters are highlighted. The partial text contents that are likely to interest the user are thus automatically highlighted, without requiring the user to input a search word from the menu of the browser, and user-friendliness is accordingly raised.

In this embodiment, natural language processing is executed on reviews posted by the user in the past and text contents of eating and drinking establishments about which the reviews have been posted, to thereby estimate partial text contents that are likely to interest the user. A method that uses machine learning for the natural language processing is taken as an example. Precision of estimation of partial text contents that are likely to interest the user is raised by, for example, highlighting the partial text contents with use of a learning model of machine learning. Details of the display control system 1 are described below.

3. Functions Implemented in the Display Control System

Figure 3:
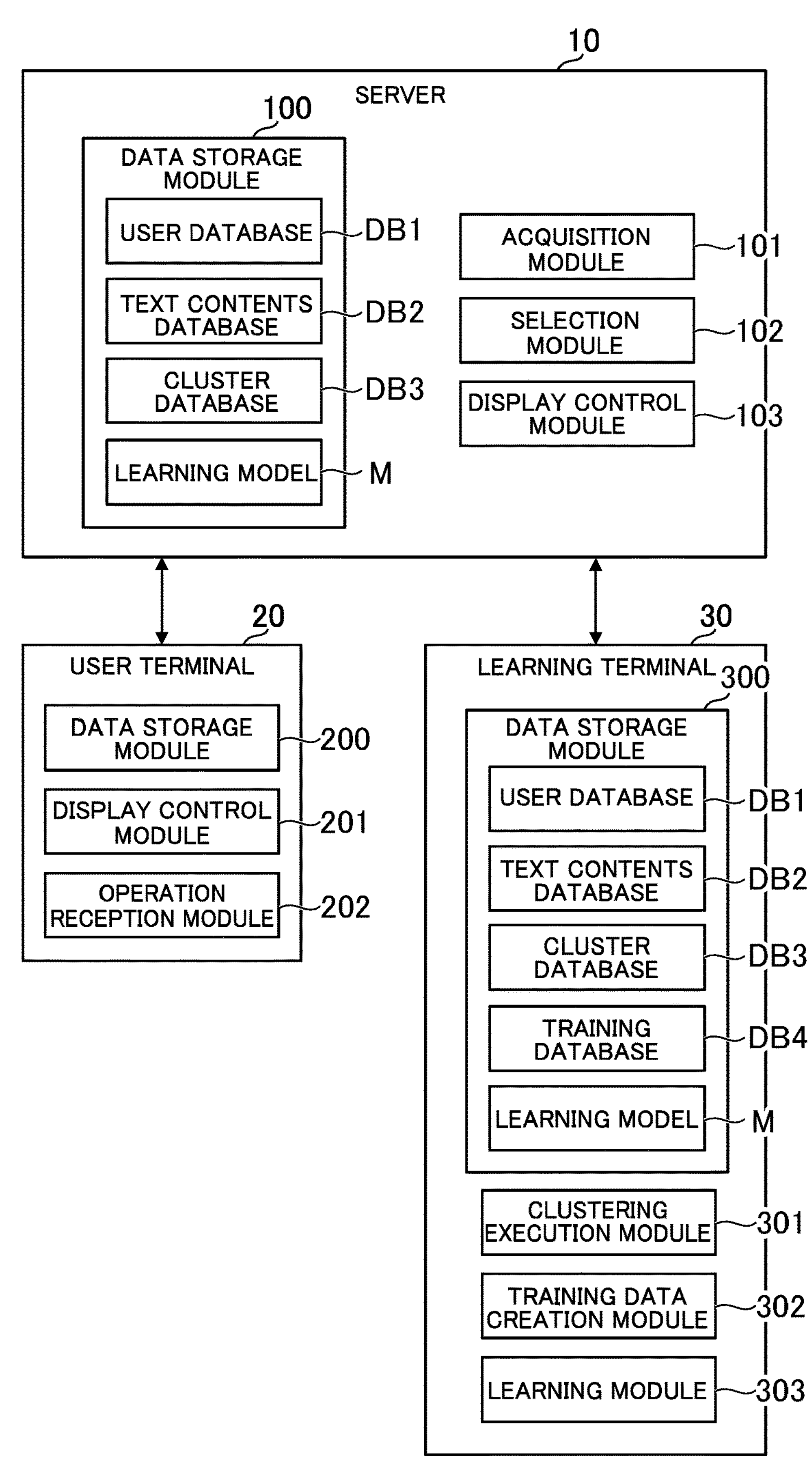
FIG. 3 is a diagram for illustrating an example of functions implemented in the display control system.

FIG. 3 is a diagram for illustrating an example of functions implemented in the display control system 1. The functions of the learning terminal 30, the functions of the server 10, and the functions of the user terminal 20 are described below in the stated order. The learning terminal 30 mainly has functions related to training of a learning model M. The server 10 and the user terminal 20 mainly have functions related to display of the review screen SC.

3-1. Functions Implemented on the Learning Terminal

The learning terminal 30 includes, for example, a data storage module 300, a clustering execution module 301, a training data creation module 302, and a learning module 303. The data storage module 300 is implemented by the storage unit 32. The clustering execution module 301, the training data creation module 302, and the learning module 303 are implemented by the control unit 31.

Data Storage Module

The data storage module 300 stores data required for training of the learning model M. For example, the data storage module 200 stores a user database DB1, a text contents database DB2, a cluster database DB3, a training database DB4, and the learning model M.

FIG. 4 is a table for showing an example of the user database DB1. The user database DB1 is a database storing various types of information about the user (and information about posters). For example, a user ID, a name of the user, and review information are stored in the user database DB1. It is sufficient for the user database DB1 to store some information about the user, and information stored in the user database DB1 is not limited to the example of FIG. 4. For instance, the user database DB1 may store partial text contents specified by the user. In this case, the partial text contents specified by the user may be highlighted.

The user ID is an example of user identification information by which the user is identifiable. Accordingly, "user ID" in descriptions can be read as user identification information. The user identification information may be information other than the user ID, and is not limited to the user ID. For example, the user identification information may be an email address or a phone number. The user identification information can be any information by which the user is identifiable in some form. For example, when the user registers to the gourmet site as a member, a user ID is generated and various types of information such as the name of the user are stored in the user database DB1.

The review information is information about a review posted by the user. The review information indicates a review ID, a shop ID, the body of the review, rating, and a post date and time. The review ID is an example of review identification information by which the review is identifiable. Accordingly, "review ID" in descriptions can be read as review identification information. The review identification information may be information other than the review ID, and is not limited to the review ID. For example, the review identification information may be a serial number. Each time the user posts a review, a new review ID is issued and is stored in the user database DB1 along with such information as a shop ID of the eating and drinking establishment about which the review is posted and the body of the review input by the user. Information about a plurality of reviews may be grouped into one piece of review information.

The shop ID is an example of shop identification information usable to identify an eating and drinking establishment of which information is published on the gourmet site. Accordingly, "shop ID" in descriptions can be read as shop identification information. The shop identification information may be information other than the shop ID, and is not limited to the shop ID. For example, the shop identification information may be a name, an email address, a phone number, or an address of the shop. The body of the review is at least one letter input by the user. The body of the review may include a symbol other than letters, a still image, or a moving image. A maximum number of letters may be set to reviews.

The rating is an evaluation on the eating and drinking establishment. The rating is a part of the review. There may be a plurality of ratings for one eating and drinking establishment. For example, there may be four ratings which are a rating in taste, a rating in price, a rating in atmosphere, and a rating in access for one eating and drinking establishment. The post date and time is a date and time at which the review is posted. The review information may indicate other types of information about the review. For example, the review information may indicate a title of the review.

FIG. 5 is a table for showing an example of the text contents database DB2. The text contents database DB2 is a database in which information about text contents is stored. For example, a shop ID, a URL of the review screen SC or the like, and text contents information are stored in the text contents database DB2. It is sufficient for the text contents database DB2 to store some information about text contents, and the information stored in the text contents database DB2 is not limited to the example of FIG. 5. For instance, other types of information, such as a genre and a photograph of the shop, may be stored in the text contents database DB2.

The text contents information is information about text contents. For example, the text contents information includes review information about a review posted by at least one user. For each eating and drinking establishment, the review information about a review posted with respect to the eating and drinking establishment is stored in the text contents database DB2. Contents of each piece of review information may be the same as contents of the review information stored in the user database DB1. In the example of FIG. 5, however, the user ID of the poster is included in the review information as well. Each time a user posts a review of an eating and drinking establishment, the review information is added as the text contents information of the eating and drinking establishment. The text contents information may include information other than the review information. The text contents information may include basic information such as an address and a phone number of the eating and drinking establishment, information about a menu of the eating and drinking establishment, descriptive text input by the eating and drinking establishment, or other types of information.

FIG. 6 is a table for showing an example of the cluster database DB3. The cluster database DB3 is a database in which information about clusters is stored. A cluster is a group of expressions having similar meanings. Those expressions are hereinafter referred to as "candidate expressions." In this embodiment, candidate expressions are candidates for partial text contents. In other words, candidate expressions are search queries for searching text contents for partial text contents to be highlighted. Candidate expressions may be used for a purpose other than highlighting partial text contents. For example, candidate expressions may be used as search queries for displaying search results.

A cluster is also referred to as "topic." A candidate expression is also referred to as "topic word." A candidate expression includes at least one letter. A candidate expression is, for example, a keyword or a key phrase. For example, a cluster ID, a cluster name, and candidate expressions belonging to the cluster are stored in the cluster database DB3. Other types of information may be stored in the cluster database DB3. The information stored in the cluster database DB3 is not limited to the example of FIG. 6. For instance, a size (the number of candidate expressions) of the cluster may be stored in the cluster database DB3.

The cluster ID is an example of cluster identification information by which the cluster is identifiable. Accordingly, "cluster ID" in descriptions can be read as cluster identification information. The cluster identification information may be information other than the cluster ID, and is not limited to the cluster ID. For example, the cluster identification information may be a cluster name. The cluster identification information can be any information by which the cluster is identifiable in some form. When executing clustering, the clustering execution module 301 described later generates a cluster ID and stores the cluster ID in the cluster database DB3 along with candidate expressions that belong to the cluster.

The cluster name is a name designated by a creator of the learning model M separately from the cluster ID for easier grasping of the cluster. Instead of the creator designating the cluster name, a candidate expression having the highest frequency of appearance out of the candidate expressions belonging to the cluster may automatically be set as the cluster name. To give another example, a candidate expression that has an embedded expression at a location closest to a center point of the cluster in a vector space may be used as the cluster name. In the example of FIG. 6, the meaning of candidate expressions, such as taste, price, atmosphere, and access, is used as the cluster name. Any name indicating a classification of candidate expressions can be designated as the cluster name. Candidate expressions having a meaning that is indicated by the name of a cluster belong to the cluster.

At least one candidate expression belongs to a cluster. Although a case in which a plurality of candidate expressions belong to a cluster is described in this embodiment, there may be a cluster to which only one candidate expression belongs. The plurality of candidate expressions belonging to the same cluster have meanings close to one another. Here, meanings being close to one another refers to a difference in embedded expression being small. An embedded expression is an index that is a quantified meaning of a candidate expression. For example, when an embedded expression is expressed in the form of a multi-dimensional vector, meanings are closer to each other when a distance between vectors is short. The embedded expression may be expressed in a format other than the multi-dimensional vector. For example, the embedded expression may be expressed by an array or a single numerical value.

FIG. 7 is a table for showing an example of the training database DB4. The training database DB4 is a database in which training data to be learned by the learning model M is stored. Any number of pieces of training data may be stored in the training database DB4. For example, several tens to several thousand pieces of training data, or more, may be stored in the training database DB4. A piece of training data is, for example, a pair of an input part and an output part. In this embodiment, this pair is referred to as "training data," and an aggregation of a plurality of pieces of training data is referred to as "training database DB4."

The input part of a piece of training data is a part of the piece of training data that is input to the learning model M in learning. The input part of a piece of training data may be input directly to the learning model M, or some kind of pre-processing may be inserted before the input part is input to the learning model M. As a general rule, the input part of a piece of training data is in the same format as a format of data input to the learning model M in estimation. The input part of a piece of training data, however, may be in a format slightly different from the format of data input to the learning model M in estimation. For example, the input part of a piece of training data may have missing values to some degree.

In this embodiment, the input part of a piece of training data is training user characteristics information about characteristics of a training user. A training user is a user for training. A training user may be an actual user who has posted a review, or a virtual user who does not exist. Characteristics are features related to a person. The characteristics may be any information that expresses features of a person in some form of quantification, for example, features of input sentences, preferences, contents to which importance is given, or contents to which not much importance is given.

In the example of FIG. 7, the input part of a piece of training data is an embedded expression of at least one letter. For example, the input part of a piece of training data is a combined training expression created by combining a training review expression, which is an embedded expression of a partial training review extracted from a training review defined as a review of the training user, and a training contents expression, which is an embedded expression of partial training contents extracted from training contents defined as text contents for which the review has been posted. A method of creating the input part of a piece of training data is described later.

The input part of a piece of training data is not limited to the example of this embodiment. For instance, the input part of a piece of training data may be the training review expression alone, or may be the training contents expression alone. To give another example, the input part of a piece of training data may be a combined training expression in which a plurality of training review expressions are combined, or may be a combined training expression in which a plurality of training contents expressions are combined. The input part of a piece of training data may be in any data format, and is not limited to the example of this embodiment. For instance, the input part of a piece of training data may be at least one letter as it is. To give another example, the input part of a piece of training data may be the partial training review itself, or may be the training contents themselves.

The output part of a piece of training data is a part of the piece of training data that is to be output from the learning model M in learning. The output part of a piece of training data is a part corresponding to a ground truth in learning. The learning model M has a higher precision when a difference between actual output from the learning model M and the output part of a piece of training data is smaller. As a general rule, the output part of a piece of training data is in the same format as a format of data output from the learning model M in estimation. The output part of a piece of training data, however, may be in a format slightly different from the format of data output from the learning model M in estimation. For example, the output part of a piece of training data may have missing values to some degree.

In this embodiment, the output part of a piece of training data is information related to partial text contents that are highlighted. Although the output part of a piece of training data can be highlighted partial text contents themselves, this embodiment takes a case in which the output part of a piece of training data is information used to identify partial text contents to be highlighted as an example. In the example of FIG. 7, the output part of a piece of training data is a pair of a cluster ID plus a cluster name and a label. The label is information indicating whether the input part of the piece of training data belongs to the cluster. That is, the label is information indicating whether the cluster is a topic that interests a user who has characteristics corresponding to the input part of the piece of training data. In the example of FIG. 7, the label having a value "1" means that the input piece belongs to the cluster, and the label having a value "0" means that the input piece does not belong to the cluster.

In the example of FIG. 7, the combined training expression of User D who is a training user indicates contents about taste and contents about price. For the combined training expression of User D, the label is "1" with respect to a cluster C1 related to taste and a cluster C2 related to price. This means that User D is interested in taste and price. The combined training expression of this user does not indicate contents about atmosphere and contents about price, and, accordingly, the label is "0" with respect to a cluster C3 related to atmosphere and a cluster C4 related to access. This means that User D is not interested in atmosphere and access. The same applies to pieces of training data corresponding to other users, namely, User E and User F.

The output part of a piece of training data may be associated with a score instead of a label. The score is an adequateness as partial text contents to be highlighted. The adequateness in this embodiment is a degree to which the user is interested in. In this embodiment, a case in which the score is expressed in numerical values is described. The score, however, may be expressed by a letter or a symbol. In this embodiment, a higher score means a higher adequateness as partial text contents.

The output part of a piece of training data is not limited to the example of this embodiment. For instance, the output part of a piece of training data may be a pair of a cluster ID or a cluster name and a label or a score, instead of a pair of a cluster ID plus a cluster name and a label or a score. The output part of a piece of training data may be at least one of a cluster ID or a cluster name without including a label and a score. The output part of a piece of training data may be partial text contents themselves that are adequate as partial text contents to be highlighted, instead of the cluster.

The learning model M is a model created by using a method of machine learning. Various methods are usable for machine learning itself, and, for example, a neural network, a support vector machine, or a transformer may be used. The data storage module 300 stores a program and parameters of the learning model M. The parameters of the learning model M are adjusted by learning. The data storage module 300 stores the learning model M that has initial values for the parameters. After learning is executed by the learning module 303 described later, the data storage module 300 stores the trained learning model M. The trained learning model M is transmitted to the server 10.

The data stored in the data storage module 100 is not limited to the example given above. The data storage module 100 may store any data. For example, the data storage module 100 may store display data for displaying the review screen SC. The display data can be any data for displaying some screen on the user terminal 20. For example, in a case in which a browser is used, the display data is HTML data. In a case in which a dedicated application other than the browser is used, the display data is image data for displaying some screen on the application.

Clustering Execution Module

The clustering execution module 301 executes clustering of candidate expressions which are candidates for partial text contents to be highlighted. In this embodiment, a case in which a candidate expression is a keyword is described. However, a key phrase including a plurality of words may correspond to a candidate expression, or a combination of a keyword and a key phrase may correspond to a candidate expression. Accordingly, a keyword in the description of this embodiment can be read as a key phrase or any other form of candidate expression. Further, in this embodiment, a case in which a candidate expression to be highlighted is the partial training review or the partial training contents is described.

The clustering execution module 301 generates the cluster database DB3 based on a result of executing clustering, and stores the cluster database DB3 in the data storage module 100. Clustering is processing of grouping together expressions that have meanings similar to one another. Clustering is also called grouping. Various publicly known methods are usable for the clustering itself. For example, the clustering execution module 301 executes clustering based on a hierarchical method such as a nearest neighbor method or a furthest neighbor method, or on a non-hierarchical method such as a k-nearest neighbor method.

FIG. 8 is a diagram for illustrating an example of a flow of clustering. The clustering execution module 301 executes clustering based on, for example, the partial training review, which is a part of the training review. The clustering execution module 301 executes a morphological analysis on the training review to extract a part that is a noun or an adjective as the partial training review. In a case in which a key phrase is used instead of a keyword, a part in which an adjective and a noun appear in succession may be extracted. The clustering execution module 301 acquires, based on a library of natural language processing, the training review expression, which is an embedded expression of the partial training review extracted from the training review. Publicly known libraries are usable for the acquisition of the embedded expression, and, for example, fastText, GloVe, or Word2Vec may be used.

For example, the clustering execution module 301 executes clustering based on the partial training contents, which are a part of the training contents defined as text contents for which the training review has been posted. The clustering execution module 301 executes a morphological analysis on the training contents to extract a part that is a noun or an adjective as the partial training contents. In a case in which a key phrase is used instead of a keyword, a part in which an adjective and a noun appear in succession may be extracted. The training contents include various types of information such as a title of a page on which an eating and drinking establishment is introduced, descriptive text, and basic information, and, accordingly, the partial training contents are extracted from each of those various types of information. The clustering execution module 301 acquires, based on a library of natural language processing, the training contents expression, which is an embedded expression of the partial training contents extracted from the training contents. Publicly known libraries are usable for the acquisition of the embedded expression, and, for example, fastText, GloVe, or Word2Vec may be used.

For example, the clustering execution module 301 executes clustering based on training review expressions acquired based on various training reviews, and training contents expressions acquired based on various training contents. In the example of FIG. 8, a case in which there are ten clusters of clusters C1 to C10 is described. In the following description, the clusters C1 to C10 are simply referred to as "clusters C" when discrimination from one cluster to another cluster is not required. There may be any number of clusters C, and the number of clusters C is not limited to the example of FIG. 8. The clustering execution module 301 may specify one cluster C to nine clusters C, or eleven or more clusters C. The number of clusters C may be specified by a creator who creates the learning model M. In FIG. 8, a rectangular frame enclosing the clusters C indicates the vector space.

For example, the clustering execution module 301 executes clustering so that expressions at a close distance from each other in the vector space belong to the same one of the clusters C. The number of candidate expressions belonging to one of the clusters C and the number of candidate expressions belonging to another of the clusters C may be the same or different from each other. The clustering execution module 301 issues a cluster ID for each one of the clusters C, and creates the cluster database DB3 so that candidate expressions belonging to the one of the clusters C are associated with the cluster ID.

Although a case in which the clustering execution module 301 executes clustering based on both of the training review and the training contents is described in this embodiment, the clustering execution module 301 may execute clustering based on only one of the training review expression or the training contents expression. The clustering execution module 301 may execute clustering based on expressions included in a document other than the training review and the training contents. For example, the clustering execution module 301 may execute clustering based on expressions published on a website other than a gourmet site (for example, an Internet encyclopedia).

Training Data Creation Module

The training data creation module 302 creates the training data. For example, the training data creation module 302 creates the training data to be learned by the learning model M based on the result of executing clustering. The training data creation module 302 creates the training data including an input part that corresponds to the partial training review included in one training review, and an output part that indicates that the label of a cluster to which this partial training review belongs is "1." The training data creation module 302 creates the training data including an input part that corresponds to the partial training contents included in one set of training contents, and an output part that indicates that a label of a cluster to which the included partial training contents belong is "on."

FIG. 9 and FIG. 10 are diagrams for illustrating an example of a flow of creating the training data. In the example of FIG. 9, a flow of creating the training data from a review of User D of FIG. 2 is illustrated. For example, the training data creation module 302 extracts the partial training review from a past training review posted by User D, to thereby acquire the training review expression. The training data creation module 302 extracts the partial training contents from the training contents that are text contents for which User D has posted the training review, to thereby acquire the training contents expression. The flow of those steps may be the same as the flow of clustering.

For example, the training data creation module 302 acquires the combined training review expression by combining training reviews of a plurality of partial training reviews extracted from the training review. The combining in this embodiment means integrating a plurality of embedded expressions into one. For example, the training data creation module 302 calculates the combined training review expression by calculating a mean value of a plurality of embedded expressions. The combined training review expression may be a simple mean value, or a weighted mean value. Any value can be set as a weighting coefficient in weighted mean. The combining may be executed by identifying a maximum value instead of a mean value, or by linking vectors in a lateral direction. The combining may use, for example, a method called attention fusion.

For example, the training data creation module 302 acquires the combined training contents expression by combining training contents expressions of a plurality of sets of partial training contents extracted from the training contents. In this embodiment, the training data creation module 302 acquires the combined training contents expression by calculating a mean value of a plurality of embedded expressions. The combining for acquiring the combined training contents expression is accomplished by various types of calculation such as calculation of a mean value, as is the case for the combining for acquiring the combined training review expression. Turning to FIG. 10, the training data creation module 302 acquires the combined training expression by combining the combined training review expression and the combined training contents expression. This combined training expression corresponds to the input part of the training data. The combining for acquiring the combined training contents expression is accomplished by various types of calculation such as calculation of a mean value, as is the case for the combining for acquiring the combined training review expression and the combining for acquiring the combined training contents expression.

For example, the training data creation module 302 determines, based on the cluster database DB3, whether the partial training review extracted from the training review and the partial training contents extracted from the training contents each belong to a cluster. The training data creation module 302 sets "1" to the label of each of the clusters to which the partial training review extracted from the training review and the partial training contents extracted from the training contents are determined to belong, to thereby create the output part of the training data. The training data creation module 302 creates the training data by linking together the input part and the output part of the training data which are created in the manner described above. The training data creation module 302 executes the same processing on other training reviews and training contents to create pieces of training data.

The method of creating the training data is not limited to the example given above. For instance, the training data creation module 302 may execute clustering based on only one of the training review or the training contents. The training data creation module 302 may create the training data based on expressions included in documents other than the training review and the training contents. For example, the training data creation module 302 may create the training data based on expressions published on a website other than a gourmet site (for example, an Internet encyclopedia). For example, the training data may be created manually by the creator who creates the learning model M. In this case, the training data creation module 302 creates the training data by receiving input operation performed by the creator.

Learning Module

The learning module 303 causes the learning model M to learn the training data. Various methods used in machine learning is usable as a method of learning the training data. For example, the learning module 303 may use a gradient descent method or an error back-propagation method to cause the learning model M to learn the training data. The learning module 303 adjusts the parameters of the learning model M so that, when the input part of the training data is input, the output part of the training data is output.

In this embodiment, learning is executed based on a cluster to which the partial training review defined as a part of the training review belongs. The partial training review is a keyword or a key phrase. The output part of the training data includes information about the cluster. For example, a pair of a cluster ID plus a cluster name and a label corresponds to the information about the cluster. As described above, the output part of the training data may be only one of a cluster ID or a cluster name, or may be candidate expressions belonging to the cluster. Those pieces of information may correspond to the information about the cluster.

In this embodiment, learning is executed based on the training review and the training contents defined as text contents for which the training review has been posted. The training data is created based on both of the training review and the training contents. The learning module 303 causes the learning model M to learn both of the training review and the training contents. In the case of the training data of FIG. 7, the input part and the output part of the training data are each created based on both of the training review and the training contents, and the learning module 303 accordingly causes the learning model M to learn both of the training review and the training contents by causing the learning model M to learn the training data of FIG. 7.

In this embodiment, learning is executed based on the combined training expression created by combining the training review expression, which is an embedded expression of the training review, and the training contents expression, which is an embedded expression of the training contents. The training data of FIG. 7 includes the combined training expression as the input part, and the learning module 303 accordingly causes the learning model M to learn the combined training expression included as the input part in the training data. In a case in which the training data includes an embedded expression that is not combined yet, the learning module 303 causes the learning model M to learn after the training review expression and the training contents expression are combined. The learning module 303 executes training of the learning model M so that, when the combined embedded expression of one piece of training data is input to the learning model M, the output part of this piece of training data is output.

In this embodiment, learning is executed based on the combined training expression in which a plurality of training review expressions and a training contents expression are combined. In the case of the training data of FIG. 7 which includes the combined embedded expression as the input part, the learning module 303 causes the learning model M to learn the combined embedded expression included as the input part in the training data. In the case in which the training data includes an embedded expression that is not combined yet, the learning module 303 causes the learning model M to learn after the plurality of training review expressions are combined and the training contents expression is further combined. The learning module 303 executes training of the learning model M so that, when the combined embedded expression of one piece of training data is input to the learning model M, the output part of this piece of training data is output.

In this embodiment, learning is executed based on the combined training expression in which a training review expression and a plurality of training contents expressions are combined. In the case of the training data of FIG. 7 which includes the combined embedded expression as the input part, the learning module 303 causes the learning model M to learn the combined embedded expression included as the input part in the training data. In the case in which the training data includes an embedded expression that is not combined yet, the learning module 303 causes the learning model M to learn after the plurality of training contents expressions are combined and the training review expression is further combined. The learning module 303 executes training of the learning model M so that, when a first combined embedded expression of one piece of training data is input to the learning model M, the output part of this piece of training data is output.

In this embodiment, the plurality of training contents expressions are embedded expressions related to items different from one another out of one set of training contents. For example, the learning module 303 causes the learning model M to learn a training contents expression of partial training contents acquired from a title of the training contents, and a training contents expression of partial training contents acquired from descriptive text of the training contents. The learning module 303 combines those expressions into a combined embedded expression, and causes the learning model M to learn based on the combined embedded expression. The items different from one another can be any combination of items included in text contents, and are not limited to the combination of the title and the descriptive text. For example, the basic information of the eating and drinking establishment and a comment attached to a photograph may qualify as the items different from one another.

3-2. Functions Implemented on the Server

The server 10 includes, for example, a data storage module 100, an acquisition module 101, a selection module 102, and a display control module 103. The data storage module 100 is implemented by the storage unit 12. The acquisition module 101, the selection module 102, and the display control module 103 are implemented by the control unit 11.

Data Storage Module

The data storage module 100 stores data required to control display of text contents. For example, the data storage module 100 stores the user database DB1, the text contents database DB2, the cluster database DB3, and the learning model M. In this embodiment, a case in which those pieces of data stored in the data storage module 100 are the same as the data stored in the data storage module 200 of the learning terminal 20 is described. However, some of the data stored in the data storage module 100 may differ from the data stored in the data storage module 300. The data storage module 100 stores the trained learning model M.

Acquisition Module

The acquisition module 101 acquires user characteristics information about characteristics of the user. The characteristics can be reworded as classifications or attributes. In this embodiment, the characteristics are information about partial text contents that are likely to interest the user. For example, information about a cluster output from the learning model M (e.g., information corresponding to the output part of the training data) corresponds to the user characteristics information. The user characteristics information can be any information that expresses the characteristics in some form, and is not limited to the example of this embodiment. For example, demographic information such as gender or age, the user's action history (for example, a website viewing history or a purchase history of commercial products), search queries input by the user, or position information about a position identified based on the communication unit 23 of the user terminal 20 or on a GPS receiver, or a combination of those may correspond to the user characteristics information.

This embodiment takes, as an example, a case in which the acquisition module 101 acquires the user characteristics information based on a user review, which is a review posted by the user. The user review is a review posted by the user in the past. The eating and drinking establishment of which page the user is currently viewing may be the same as or differ from the eating and drinking establishment about which the user review has been posted. In this embodiment, the user review is a review for which the review information is stored in the user database DB1. The user review may be stored in a database other than the user database DB1. For example, the user review may be stored in the text contents database DB2 or another database.

This embodiment takes, as an example, a case in which the acquisition module 101 acquires the user characteristics information based on the user review and the learning model M in which learning has been executed based on the training review, which is a review for training. The acquisition module 101 may acquire the user characteristics information based on, instead of the learning model M using machine learning, a rule that defines a relationship between the user review and the user characteristics information. For example, the rule defines a relationship between a keyword or a key phrase included in the user review and a characteristic of the user. To give another example, the acquisition module 101 may execute a morphological analysis on the user review to acquire all nouns or some nouns as the user characteristics information. The user characteristics information can be any information for specifying partial text contents, and processing for acquiring the user characteristics information is not limited to the example of this embodiment.

In this embodiment, the acquisition module 101 acquires, based on the user review and the learning model M, the user characteristics information about a cluster that depends on the user review. Meaning of the information about the cluster is as described above. The learning model M in this embodiment outputs a pair of a cluster and a label as the user characteristics information, and the acquisition module 101 accordingly acquires the user characteristics information by acquiring the output of the learning model M based on the user review.

Figure 12:
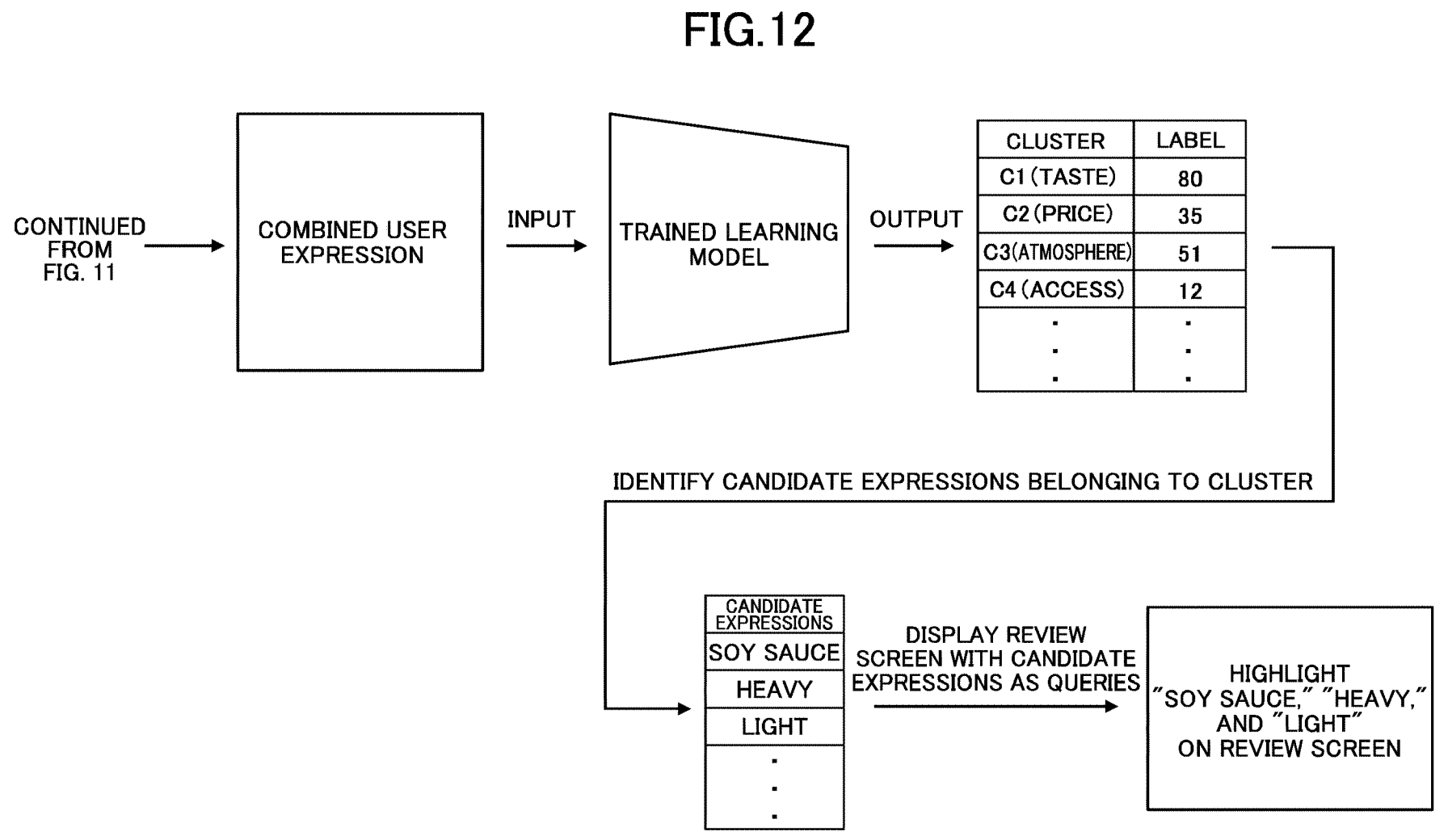

FIG. 11 and FIG. 12 are diagrams for illustrating an example of processing of acquiring the user characteristics information with the use of the learning model M. In the example of FIG. 11 and FIG. 12, processing of acquiring the user characteristics information when the review screen SC of FIG. 2 is displayed is illustrated. In the example of FIG. 2, User C is accessing the review screen SC of a BBB ramen shop, and the user characteristics information is accordingly acquired based on the user review of User C and on text contents of the BBB ramen shop. User C may have posted a user review with respect to the BBB ramen shop, or may have posted user reviews only with respect to other eating and drinking establishments, without having posted a user review with respect to the BBB ramen shop.

As in FIG. 11 and FIG. 12, the overall flow of the processing of acquiring the user specification information is the same as the flow of the processing executed in learning and described with reference to FIG. 9 and FIG. 10. For example, the acquisition module 101 acquires the combined user expression by combining user review expressions, which are embedded expressions of a plurality of user reviews, and acquires the user characteristics information based on the combined user expression and on the learning model M. In a case in which User C has posted only one user review, the acquisition module 101 acquires the user characteristics information based on the user review expression that is an embedded expression of the one user review.

In the example of FIG. 11, the acquisition module 101 extracts a plurality of partial user reviews from the user review of User C. This processing is the same as the processing of extracting the partial training reviews from the training review. The acquisition module 101 acquires user review expressions, which are embedded expressions of the plurality of partial user reviews. This processing is the same as the processing of acquiring training review expressions from the partial training reviews. The acquisition module 101 combines the plurality of user review expressions, to thereby acquire a combined user review expression. This processing is the same as the processing of combining the plurality of training review expressions.

For example, the acquisition module 101 extracts a plurality of sets of partial text contents from text contents of the BBB ramen shop. This processing is the same as the processing of extracting sets of partial training contents from the training contents. The acquisition module 101 acquires text contents expressions, which are embedded expressions of the plurality of sets of partial text contents. This processing is the same as the processing of acquiring the training contents expressions from the sets of partial training contents. The acquisition module 101 combines the plurality of text contents expressions, to thereby acquire a combined text contents expression. This processing is the same as the processing of combining the plurality of training contents expressions.

Turning to FIG. 11, for example, the acquisition module 101 combines the user review expressions, which are embedded expressions of the user review, and the text contents expressions, which are embedded expressions of the text contents, to thereby acquire the combined user expression, and acquires the user characteristics information based on the combined user expression and the learning model M. The acquisition module 101 inputs the combined user expression to the learning model M. The learning model M executes convolution or other processing as required, and then outputs the user characteristics information that depends on the input combined user expression. The acquisition module 101 acquires the output user characteristics information.

In the example of FIG. 12, the user characteristics information is a pair of a cluster and a score. The user characteristics information may include, instead of the score, the same label as the label in the output part of the training data. A high score means that the probability of candidate expressions that belong to the cluster being adequate (the probability of the user being interested in the candidate expressions) is high. Various publicly known scoring methods are usable for the scoring of machine learning. Instead of a pair of a cluster and a score, the cluster ID of a cluster having the highest score may be output alone, or the cluster IDs of all clusters that have scores equal to or higher than a threshold value may be output. For example, the cluster IDs of a predetermined number of clusters may be output in descending order of scores.

Selection Module

The selection module 102 selects, based on the user characteristics information, out of text contents which are contents including letters, partial text contents which are a part of the text contents, without requiring text input from the user. Text input is an act of pressing a key on a keyboard when the operation unit 24 is a keyboard. When the operation unit 24 is a touch panel, text input is a flick or a tap on a software keyboard displayed on the display unit 25. "Without requiring text input" means that none of those kinds of operation is required. Text input is not limited to input from the operation unit 24, and may be audio input.

Partial text contents are at least one letter. Partial text contents may be any number of letters, and may be only one letter, two to ten letters, or more. Partial text contents may include elements other than letters. The other elements are a part of text contents and are, for example, still images or moving images. For example, the selection module 102 selects partial text contents that depend on the user characteristics information from the text contents.

In the example of FIG. 12, the pair of a cluster and a score output from the learning model M corresponds to the user characteristics information. For example, the selection module 102 searches text contents with candidate expressions that belong to a cluster having the highest score as queries. The cluster having the highest score in the example of FIG. 12 is Cluster C1. The selection module 102 accordingly searches the text contents by using, as queries, candidate expressions, such as "soy sauce," "heavy," and "light," which are the candidate expressions of Cluster C1. In the search, an exact match may be required, or a fuzzy search in which an exact match is not a requirement may be executed. The selection module 102 selects, from the text contents, parts that are hits in the search as partial text contents.

The selection module 102 may use, as queries, candidate expressions that belong to clusters having the second-highest and subsequent scores, in addition to the cluster having the highest score. For example, the selection module 102 may select a predetermined number of clusters in descending order of scores, and use candidate expressions that belong to the selected clusters as queries. The selection module 102 may select all clusters that have scores equal to or higher than a threshold value to use candidate expressions belonging to the selected clusters as queries.

The selection module 102 may select partial text contents depending on contents of the user characteristics information. For example, when the user characteristics information is a combination of a cluster and a label, the selection module 102 may search the text contents by using, as equerries, candidate expressions belonging to a cluster for which the label is set to "1." When the user characteristics information indicates candidate expressions themselves, for example, the selection module 102 may search the text contents with the candidate expressions indicated by the user characteristics information as queries.

Display Control Module

The display control module 103 displays text contents on the display unit 25 (an example of a display) in a manner that makes partial text contents distinguishable. Displaying partial text contents in a distinguishable manner means displaying partial text contents and other parts in different manners. For example, the display control module 103 highlights the partial text contents out of the text contents. Highlighting is image processing for placing a visual emphasis, for example, changing a background color, changing a text color, changing a letter font, increasing a font size, typing in italics, underlining, or adding other effect, or a combination of those.

In the example of FIG. 2, the display control module 103 highlights partial text contents out of text contents. A highlight may be displayed in a predetermined color. In this embodiment, the display control module 103 is implemented by the server 10, and accordingly generates display data of text contents that makes partial text contents distinguishable to be transmitted to the user terminal 20. The text contents are thus displayed on the display unit 25. The display data may be in any format. For example, when the text contents are to be displayed on a browser, the display data is in an HTML format. When an application other than a browser is used, the display data can be in a format of image data or the like that is supported by the another application.

3-3. Functions Implemented on the User Terminal

The user terminal 20 includes a data storage module 200, a display control module 201, and an operation reception module 202. The data storage module 200 is implemented by the storage unit 22. The display control module 201 and the operation reception module 202 are implemented by the control unit 21.

Data Storage Module

The data storage module 200 stores data required to display text contents. For example, the data storage module 200 stores a browser or a dedicated application.

Display Control Module

The display control module 201 displays text contents on the display unit 25. For example, the display control module 201 displays the review screen SC on the display unit 25 based on the display data of the review screen SC which is received from the server 10. The text contents may be displayed as a screen other than the review screen SC.

Operation Reception Module

The operation reception module 202 receives various types of operation performed by the user. For example, the operation reception module 202 receives input of the user review. Contents received by the operation reception module 202 are transmitted to the server 10.

4. Processing Executed in the Display Control System

In this embodiment, learning processing in which training of the learning model M is executed and display control processing in which display of text contents is controlled are described as an example of processing executed in the display control system 1. Other types of processing are also executable in the display control system 1. Processing executed in the display control system 1 is not limited to the learning processing and the display control processing. For example, processing of receiving a post of a user review is executable.

4-1. Learning Processing

FIG. 13 is a diagram for illustrating an example of the learning processing. The learning processing is executed by the control units 11 and 13 by operating in accordance with a program stored in the storage unit 12 and a program stored in the storage unit 32, respectively. As in FIG. 13, the learning terminal 30 transmits an acquisition request of user reviews and text contents to the server 10 (Step S100). The acquisition request is a request for acquiring user reviews and text contents. The acquisition request is issued by transmitting data in a predetermined format.

The server 10 receives the acquisition request from the learning terminal 30 (Step S101), and transmits a plurality of user reviews and a plurality of sets of text contents to the learning terminal 30 by referring to the user database DB1 and the text contents database DB2 (Step S102). The learning terminal 30 receives the plurality of user reviews and the plurality of sets of text contents (Step S103). In Step S103, the learning terminal 30 records the plurality of user reviews and the plurality of sets of text contents in the storage unit 32 (Step S104). In Step S104, the learning terminal 30 creates the user database DB1 and the text contents database DB2.

From then on, the user reviews and the text contents that have been recorded in Step S104 are used as training reviews and training contents, respectively. The learning terminal 30 executes a morphological analysis on each of the plurality of training reviews to extract a partial training review (Step S105). The learning terminal 30 acquires a training review expression that is an embedded expression of the partial training review extracted in Step S105 (Step S106). The learning terminal 30 executes a morphological analysis on each of the plurality of sets of training contents to extract a set of partial training contents (Step S107).

The learning terminal 30 acquires a training contents expression that is an embedded expression of the set of partial training contents extracted in Step S107 (Step S108). The learning terminal 30 combines the training review expression acquired in Step S106 and the training contents expression acquired in Step S108 to acquire a combined training expression, and thus creates the input part of the training data (Step S109). In the data storage example of FIG. 4 and FIG. 5, the processing steps of Step S105 to Step S109 are executed for each pair of an individual training review and a set of training contents for which the training review has been posted. Accordingly, as many input parts of the training data as the number of those pairs are created.

The learning terminal 30 executes clustering based on the training review expressions extracted from various training reviews and training contents expressions extracted from various training contents (Step S110). In Step S110, the learning terminal 30 creates the cluster database DB3 based on pairs of the cluster ID plus the name of one of the clusters C and a candidate expression belonging to the one of the clusters C. The learning terminal 30 determines, for each pair of the partial training review extracted in Step S105 and the set of partial training contents extracted in Step S107, whether those are found in the clusters C as candidate expressions, and thus creates the output part of the training data (Step S111).

The clustering of Step S110 is executed for all training reviews and all training contents irrespective of the pairing of an individual training review and a set of training contents for which the individual training review has been posted. However, the clustering may be executed based on only some of the training reviews and some of the training contents. For example, only partial training reviews and partial training contents that are relatively high in appearance frequency may be selected as targets of clustering. The processing step of Step S111, on the other hand, is executed for each pair of an individual training review and a set of training contents for which the training review has been posted. Accordingly, as many output parts of the training data as the number of those pairs are created.

The learning terminal 30 creates each piece of training data by combining the input part of the piece of training data created in Step S109 and the output part of the piece of training data created in Step S111 (Step S112). In Step S112, the learning terminal 30 creates various pieces of training data and stores the created training data in the training database DB4. The learning terminal 30 executes training of the learning model M based on the training data (Step S113). The learning terminal 30 transmits the trained learning model M and the cluster database DB3 to the server 10 (Step S114). The server 10 receives the trained learning model M and the cluster database DB3 (Step S115), and the learning processing is ended. In Step S115, the server 10 records the trained learning model M and the cluster database DB3 in the storage unit 12. Subsequently, the display control processing described later is executed.

4-2. Display Control Processing

FIG. 14 is a diagram for illustrating an example of the display control processing. The processing of FIG. 14 is executed by the control units 11 and 21 by operating in accordance with a program stored in the storage unit 12 and a program stored in the storage unit 22, respectively. As in FIG. 14, the user terminal 20 transmits a display request of the review screen SC to the server 10 (Step S200). The display request is a request for displaying the review screen SC. The display request is issued by transmitting data in a predetermined format.

The server 10 receives the display request (Step S201), and acquires user reviews and sets of text contents by referring to the user database DB1 and the text contents database DB2 (Step S202). The server 10 executes a morphological analysis on each of the user reviews to extract a partial user review (Step S203). The server 10 acquires a user review expression that is an embedded expression of the partial user review extracted in Step S202 (Step S204).

The server 10 executes a morphological analysis on each of the sets of text contents to extract a set of partial text contents (Step S205). The server 10 acquires a text contents expression that is an embedded expression of the set of partial text contents extracted in Step S205 (Step S206). The server 10 combines the user review expression acquired in Step S204 and the text contents expression acquired in Step S206, to thereby acquire a combined user expression (Step S207).

The server 10 inputs the combined user expression acquired by the combining in Step S207 to the learning model M (Step S208). In Step S208, the learning model M outputs the user characteristics information that depends on the input combined user expression. The server 10 acquires the user characteristics information output from the learning model M (Step S209). The server 10 selects a cluster that has the highest score based on the user characteristics information (Step S210). The server 10 refers to the cluster database DB3 and, by using candidate expressions that belong to the cluster selected in Step S210 as queries, searches the text contents for which the display request has been issued (Step S211).

The server 10 generates display data of the review screen SC in which partial text contents that are the same as the candidate expressions belonging to the cluster selected in Step S210 are highlighted out of the text contents, based on results of the search of Step S211, and transmits the display data to the user terminal 20 (Step S212). The user terminal 20 receives the display data (Step S213), and displays the review screen SC on the display unit 25 (Step S214), and the display control processing is then ended.

The display control system 1 of this embodiment selects, based on the user characteristics information, without requiring text input from the user, partial text contents defined as a part of text contents, from among the text contents which are contents including letters. The display control system 1 displays the text contents on the display unit 25 such that the selected partial text contents are distinguishable. This helps the user to distinguish the partial text contents in the text contents without text input from the user, and thus improves user-friendliness. For example, the partial text contents that are likely to interest the user are automatically highlighted as in the review screen SC of FIG. 2, and the user is accordingly saved from the trouble of inputting a search word from a menu of a browser. The highlights on the partial text contents also save the user from the trouble of looking for the partial text contents with his or her own eyes.

The display control system 1 acquires the user characteristics information based on a user review, which is a review posted by the user. The user characteristics information that indicates the user's characteristics more aptly can be acquired by acquiring the user characteristics information based on the user review, which directly reflects the user's preferences.

The display control system 1 acquires the user characteristics information based on the user review and also on the learning model M in which learning has been executed based on the training review. The use of the learning model M enables acquisition of the user characteristics information that indicates the user's characteristics more aptly.

The learning is executed based on clusters to which partial training reviews belong. The display control system 1 acquires the user characteristics information about a cluster that depends on the user review, based on the user review and the learning model M. This enables the learning model to learn partial training reviews that have meanings similar to each other, and the user characteristics information can accordingly be acquired by taking other expressions that have meanings similar to partial user reviews into consideration. As a result, other expressions which are not the partial user reviews can also be highlighted as partial text contents.

The display control system 1 executes clustering based on the partial training review. The display control system 1 creates training data to be learned by the learning model M, based on a result of executing the clustering. The display control system 1 causes the learning model M to learn the training data. Creation of training data can thus be automated, and a creator of the learning model M is accordingly saved from the trouble.

The display control system 1 also executes clustering based on the partial training contents. The display control system 1 creates training data to be learned by the learning model M, based on a result of executing the clustering. The display control system 1 causes the learning model M to learn the training data. This automates creation of training data and, at the same time, enables the learning model M to learn a trend of the training contents. Consequently, precision of the learning model M is enhanced.

The display control system 1 acquires the user characteristics information based also on the combined user expression and the learning model M. This enables the learning model M to learn with trends of various user reviews combined, and the precision of the learning model M is consequently enhanced.

The display control system 1 acquires the combined user expression by combining the user review expression and text contents expression, and acquires the user characteristics information based on the acquired combined user expression and on the learning model M. This enables the learning model M to learn with a trend of the user review and a trend of the text contents combined, and the precision of the learning model M is consequently enhanced.

The learning is executed based also on the training review and training contents that are text contents for which the training review has been posted. This enables the learning model M to learn a relationship between the training review and the training contents, and the precision of the learning model M is consequently enhanced.

The learning is executed based also on the combined training expression in which the training review expression and the training contents expression are combined. This enables the learning model M to learn with a trend of the training review and a trend of the training contents combined, and the precision of the learning model M is consequently enhanced.

The learning is executed based also on the combined training expression in which a plurality of training review expressions and a training contents expression are combined. This enables the learning model M to learn with trends of various training reviews and a trend of the training contents combined, and the precision of the learning model M is consequently enhanced.

The learning is executed based also on the combined training expression in which a training review expression and a plurality of training contents expressions are combined. This enables the learning model M to learn with a trend of the training review and trends of various training contents combined, and the precision of the learning model M is consequently enhanced.

In the display control system 1, the plurality of training contents expressions are embedded expressions related to items different from one another out of one set of training contents. This enables the learning model M to learn trends of various items, not just a single item, and the precision of the learning model M is consequently enhanced.

5. MODIFICATION EXAMPLES

The present disclosure is not limited to the embodiment described above, and can be modified suitably without departing from the spirit of the present disclosure.

5-1. Modification Example 1

For example, some expressions indicate strong feelings, and some other expressions indicate not so strong feelings. The word "love," for instance, indicates a feeling stronger than that of "like." The word "hate" indicates a feeling stronger than that of "dislike." It is conceived that, when expressions indicating strong feelings are highlighted as partial text contents, partial text contents that are more likely to interest the user can be accentuated. Accordingly, clustering may be executed after execution of a feeling analysis.

Figure 15:
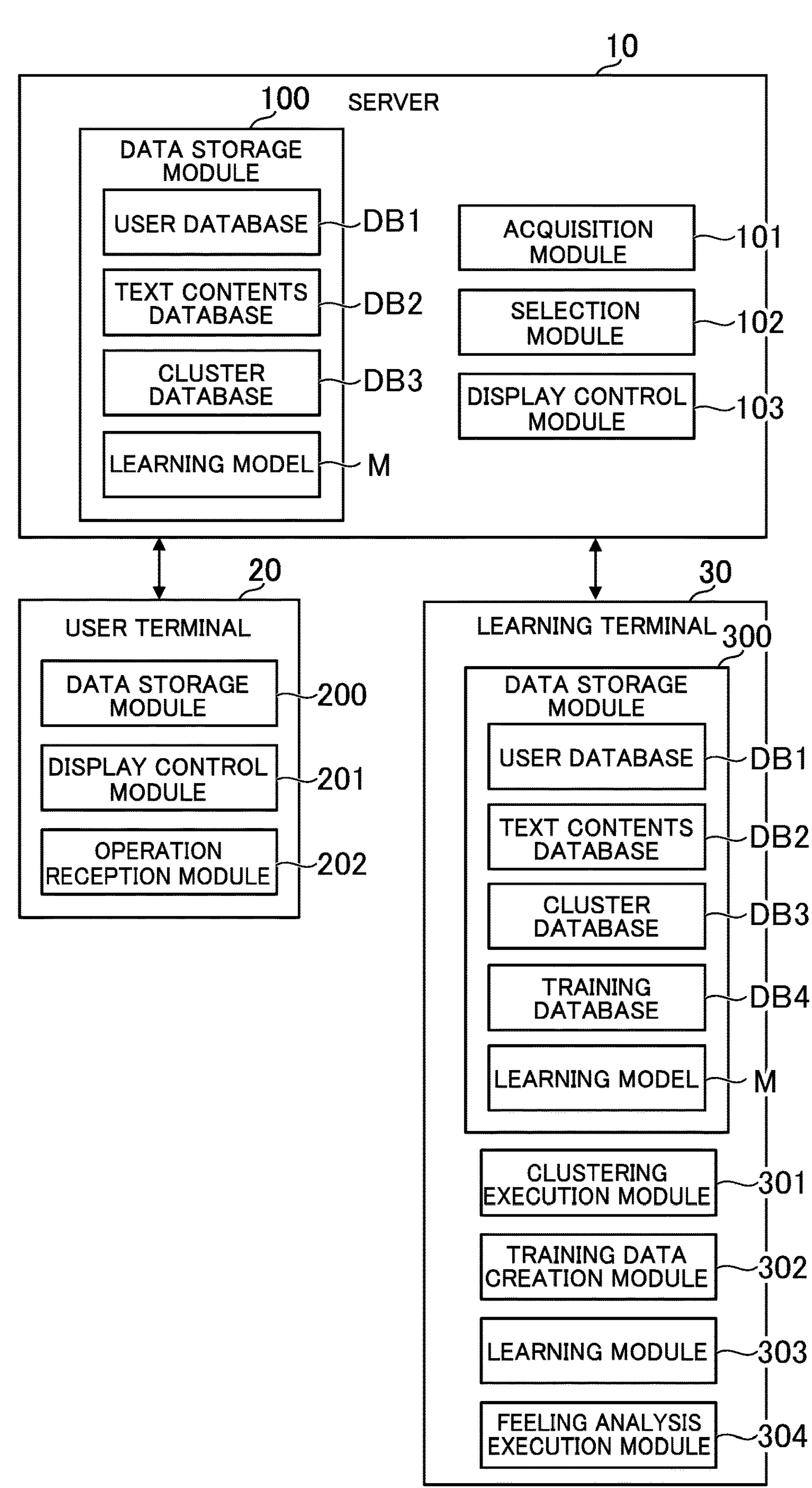
FIG. 15 is a diagram for illustrating an example of functions in Modification Example 1.

FIG. 15 is a diagram for illustrating an example of functions in Modification Example 1. The display control system 1 of Modification Example 1 includes a feeling analysis execution module 304. The feeling analysis execution module 304 executes a feeling analysis on the training review. Publicly known methods are usable for the feeling analysis itself. For example, a method of preparing, in advance, a feelings dictionary to which terms indicating feelings are registered may be used. In the feelings dictionary, a classification indicating whether a term is positive or negative is defined for each term. Numerical values indicating intensities of feelings may be defined in the feelings dictionary.

For example, the feeling analysis execution module 304 executes a morphological analysis on the training review, and determines, for each morpheme, whether the morpheme is found in the feelings dictionary, to thereby execute a feeling analysis. The feeling analysis execution module 304 may take a modification relationship between terms into consideration in executing a feeling analysis. The feeling analysis execution module 304 may execute a feeling analysis with use of a method that classifies terms into three patterns, which are positive, neutral, and negative, by text mining.

The clustering execution module 301 of Modification Example 1 executes clustering based on the partial training review and a result of executing the feeling analysis. For example, the clustering execution module 301 calculates the number of times an expression appears by setting a greater weighting coefficient to the number of times of appearance of an expression classified as positive by the feelings analysis than a weighting coefficient applied to the number of times of appearance of an expression classified as neutral. This enables the clustering execution module 301 to leave expressions that indicate stronger feelings in clusters as candidate expressions.

The display control system 1 of Modification Example 1 executes clustering based on the partial training review and the result of executing the feeling analysis. The result of executing the feeling analysis can thus be reflected on the result of executing the clustering, and precision of the clustering is consequently enhanced. For example, leaving expressions that indicate stronger feelings in clusters is accomplished with ease.

5-2. Modification Example 2

For example, the training review may be a relatively new review among a plurality of reviews posted in the past. In a case in which User D on the review screen SC of FIG. 2 has posted a hundred reviews, only ten reviews that are relatively new among the hundred reviews may be used as training reviews. The newness of a review is determined based on the post date and time of the review.

The number of relatively new reviews to be used is not limited to ten, and any number of relatively new reviews may be used. For example, the number of relatively new reviews to be used may be one to nine, or may be eleven or more. A predetermined number of reviews out of a plurality of reviews may be used as training reviews in reverse chronological order of post dates and times, or all reviews of which post dates and times are within a most recent predetermined period may be used as training reviews. Modification Example 2 differs from the embodiment in terms of the user review to be used as the training review, but is the same as the embodiment with respect to the rest.

The training review in Modification Example 2 is a relatively new review among a plurality of reviews posted in the past. This enables the learning model M to learn a latest trend. For example, contents of the review screen SC in which the user has recently taken an interest can be highlighted.

5-3. Modification Example 3

For example, the training review may be a review posted by a poster who has posted as many reviews as a threshold value or more. Any value can be set as the threshold value, which may be a fixed value or a variable value. For example, the training data creation module 302 refers to the user database DB1 to calculate, for each user, the number of reviews posted by the user. The training data creation module 302 creates the training data based on a training review reviewed by a user who has posted as many times as the threshold value or more. Modification Example 3 differs from the embodiment in terms of the user review to be used as the training review, but is the same as the embodiment with respect to the rest.

The training review in Modification Example 3 is a review posted by a poster who has posted as many reviews as the threshold value or more. This enables the learning model M to learn only reliable reviews, and the precision of the learning model M is consequently enhanced.

5-4. Modification Example 4

For example, the acquisition module 101 may acquire, as the user characteristics information, a partial user review that is relatively high in appearance frequency out of partial user reviews, which are parts of a user review. For example, the partial user review is a keyword or a key phrase that appears frequently in the user review. In Modification Example 4, the learning model M described in the embodiment is not used.

The acquisition module 101 counts, for each user, an appearance count of a keyword included in a user review. For example, the acquisition module 101 acquires, as the user specification information, a predetermined number of keywords or key phrases in descending order of the appearance count, or all keywords or key phrases that have appearance counts equal to or higher than a threshold value. The selection module 102 in Modification Example 4 searches text contents for keywords or key phrases indicated by the user characteristics information, and the found keywords or the key phrases are highlighted as partial text contents.

The display control system 1 of Modification Example 4 acquires, as the user characteristics information, a partial user review that is relatively high in appearance frequency out of partial user reviews, which are parts of a user review. In this manner, a partial user review that indicates the user's characteristics more clearly can be used as the user characteristics information.

5-5. Modification Example 5

For example, in a case in which the user characteristics information is acquired in the manner of Modification Example 4, the acquisition module 101 may execute a feeling analysis on a user review and acquire the user characteristics information based on a result of executing the feeling analysis. The acquisition module 101 weights the appearance count more heavily for a stronger feeling. In this case, the acquisition module 101 may have the same function as the function of the feeling analysis execution module 304 described in Modification Example 1. For example, the acquisition module 101 weights the appearance count more heavily for a higher numerical value defined in the feelings dictionary to indicate the intensity of a feeling. For clustering after the appearance count is calculated itself, the publicly known methods of clustering described in the embodiment are usable.

The display control system 1 of Modification Example 5 executes a feeling analysis on the user review and acquires the user characteristics information based on the result of executing the feeling analysis. The user characteristics information that takes the user's feelings into consideration can thus be acquired.

5-6. Modification Example 6

For example, the present disclosure includes configurations for attaining objects other than the object described in the embodiment, which is to raise user-friendliness. An example of the other objects is to enhance the precision of the learning model M. In this case, the configuration for highlighting the partial text contents which is described in the embodiment may be omitted. The present disclosure accordingly includes, in addition to the display control system 1, a learning system that uses the learning model M. The learning system may include the learning terminal 30 alone, or may include a computer other than the learning terminal 30. The learning system may not include the selection module 102 and the display control module 103. The learning system may include only the clustering execution module 301, the training data creation module 302, and the learning module 303.

5-7. Other Modification Examples

For example, the modification examples described above may be combined.

For example, although a case of using a learning model to estimate partial text contents that are likely to interest the user is described in the embodiment, the partial text contents that are likely to interest the user may be registered in advance by the user. In this case, partial text contents specified by the user are stored as the user characteristics information in the user database DB1. The acquisition module 101 refers to the user database DB1 and acquires the partial text contents specified by the user as the user characteristics information. The display control module 103 may select the same partial text contents as the partial text contents indicated by the user characteristics information from the text contents.

For example, it is sufficient if the functions described to be implemented by the server 10, the user terminal 20, or the learning terminal 30 are implemented by at least one computer in the display control system 1, and the functions may also be distributed among a plurality of computers. In this case, the distribution of the functions may be implemented by transmitting, from each of the plurality of computers, its own processing result to other computers. For example, the functions described to be implemented by the learning terminal 30 may be implemented by the server 10. For example, the functions described to be implemented by the server 10 may be implemented by the user terminal 20.

6. SUPPLEMENTARY NOTES

For example, the display control system may have the following configurations.

(1)

A display control system, including:

an acquisition module configured to acquire user characteristics information about characteristics of a user;

a selection module configured to select, based on the user characteristics information, from among text contents which are contents including a letter, partial text contents which are a part of the text contents, without requiring text input from the user; and a display control module configured to display the text contents on a display in a manner that makes the partial text contents distinguishable.

(2)

The display control system according to Item (1), wherein the acquisition module is configured to acquire the user characteristics information based on a user review, which is a review posted by the user.

(3)

The display control system according to Item (2), wherein the acquisition module is configured to acquire the user characteristics information based on the user review and a learning model in which learning has been executed based on a training review, the training review being a review for training.

(4)

The display control system according to Item (3), wherein the learning is executed based on a cluster to which a partial training review belongs, the partial training review being a part of the training review, and wherein the acquisition module is configured to acquire, based on the user review and the learning model, the user characteristics information about the cluster that depends on the user review.

(5)

The display control system according to Item (4), further including:

a clustering execution module configured to execute clustering based on the partial training review;

a training data creation module configured to create, based on a result of executing the clustering, training data to be learned by the learning model; and a learning module configured to cause the learning model to learn the training data.

(6)

The display control system according to Item (5), further including a feeling analysis execution module configured to execute a feeling analysis on the training review, wherein the clustering execution module is configured to execute the clustering based on the partial training review and a result of executing the feeling analysis.

(7)

The display control system according to any one of Items (4) to (6), wherein the clustering execution module is configured to execute clustering based on partial training contents, the partial training contents being a part of training contents, the training contents being text contents for which the training review is posted, wherein the training data creation module is configured to create, based on a result of executing the clustering, training data to be learned by the learning model, and wherein the learning module is configured to cause the learning model to learn the training data.

(8)

The display control system according to any one of Items (3) to (7), wherein the acquisition module is configured to:

acquire a combined user expression by combining user review expressions, which are embedded expressions of a plurality of user reviews, each of the plurality of user reviews being the user review; and acquire the user characteristics information based on the combined user expression and the learning model.

(9)

The display control system according to any one of Items (3) to (8), wherein the acquisition module is configured to:

acquire a combined user expression by combining a user review expression, which is an embedded expression of the user review, and a text contents expression, which is an embedded expression of the text contents; and acquire the user characteristics information based on the combined user expression and the learning model.

(10)

The display control system according to any one of Items (3) to (9), wherein the learning is executed based on the training review and training contents, the training contents being text contents for which the training review is posted.

(11)

The display control system according to Item (10), wherein the learning is executed based on a combined training expression in which a training review expression and a training contents expression are combined, the training review expression being an embedded expression of the training review, the training contents expression being an embedded expression of the training contents.

(12)

The display control system according to Item (11), wherein the learning is executed based on the combined training expression in which a plurality of training review expressions and the training contents expression are combined, each of the plurality of training review expressions being the training review expression.

(13)

The display control system according to Item (11) or (12), wherein the learning is executed based on the combined training expression in which the training review expression and a plurality of training contents expressions are combined, each of the plurality of training contents expressions being the training contents expression.

(14)

The display control system according to Item (13), wherein the plurality of training contents expressions are embedded expressions related to items different from one another out of the training contents.

(15)

The display control system according to any one of Items (3) to (14), wherein the training review is a relatively new review out of a plurality of reviews posted in a past.

(16)

The display control system according to any one of Items (3) to (15), wherein the training review is a review posted by a poster who has posted as many reviews as a threshold value or more.

(17)

The display control system according to any one of Items (2) to (16), wherein the acquisition module is configured to acquire, as the user characteristics information, out of partial user reviews which are parts of the user review, a partial user review that is relatively high in appearance frequency.

(18)

The display control system according to Item (17), wherein the acquisition module is configured to:

execute a feeling analysis on the user review; and acquire the user characteristics information based on a result of executing the feeling analysis.

What is claimed is:

1. A display control system, comprising at least one processor, the at least one processor being configured to:

acquire user characteristics information about characteristics of a user based on a user review, which is a review posted by the user, and a learning model in which learning has been executed based on a training review, the training review being a review for training;

wherein the learning is executed based on a cluster to which a partial training review belongs, the partial training review being a part of the training review, wherein the at least one processor is configured to acquire, based on the user review and the learning model, the user characteristics information about the cluster that depends on the user review;

select, based on the user characteristics information, from among text contents which are contents including a letter, partial text contents which are a part of the text contents, without requiring text input from the user; and display the text contents on a display in a manner that makes the partial text contents visually distinguishable.

2. The display control system according to claim 1, wherein the at least one processor is configured to:

execute clustering based on the partial training review;

create, based on a result of executing the clustering, training data to be learned by the learning model; and cause the learning model to learn the training data.

3. The display control system according to claim 2, wherein the at least one processor is configured to:

execute a feeling analysis on the training review; and execute the clustering based on the partial training review and a result of executing the feeling analysis.

4. The display control system according to claim 2, wherein the clustering comprises grouping pluralities of partial training reviews with a similar meaning; and wherein the clustering comprises executing a morphological analysis on the training review to extract a word or a phrase as the user characteristic information.

5. The display control system according to claim 1, wherein the at least one processor is configured to:

execute clustering based on partial training contents, the partial training contents being a part of training contents, the training contents being text contents for which the training review is posted;

create, based on a result of executing the clustering, training data to be learned by the learning model; and cause the learning model to learn the training data.

6. The display control system according to claim 1, wherein the at least one processor is configured to:

acquire a combined user expression by combining user review expressions, which are embedded expressions of a plurality of user reviews, each of the plurality of user reviews being the user review; and acquire the user characteristics information based on the combined user expression and the learning model.

7. The display control system according to claim 1, wherein the at least one processor is configured to:

acquire a combined user expression by combining a user review expression, which is an embedded expression of the user review, and a text contents expression, which is an embedded expression of the text contents; and acquire the user characteristics information based on the combined user expression and the learning model.

8. The display control system according to claim 1, wherein the learning is executed based on the training review and training contents, the training contents being text contents for which the training review is posted.

9. The display control system according to claim 8, wherein the learning is executed based on a combined training expression in which a training review expression and a training contents expression are combined, the training review expression being an embedded expression of the training review, the training contents expression being an embedded expression of the training contents.

10. The display control system according to claim 9, wherein the learning is executed based on the combined training expression in which a plurality of training review expressions and the training contents expression are combined, each of the plurality of training review expressions being the training review expression.

11. The display control system according to claim 9, wherein the learning is executed based on the combined training expression in which the training review expression and a plurality of training contents expressions are combined, each of the plurality of training contents expressions being the training contents expression.

12. The display control system according to claim 11, wherein the plurality of training contents expressions are embedded expressions related to items different from one another out of the training contents.

13. The display control system according to claim 1, wherein the training review is a relatively new review out of a plurality of reviews posted in a past.

14. The display control system according to claim 1, wherein the training review is a review posted by a poster who has posted as many reviews as a threshold value or more.

15. The display control system according to claim 1, wherein the at least one processor is configured to acquire, as the user characteristics information, out of partial user reviews which are parts of the user review, a partial user review that is relatively high in appearance frequency.

16. The display control system according to claim 15, wherein the at least one processor is configured to;

execute a feeling analysis on the user review; and acquire the user characteristics information based on a result of executing the feeling analysis.

17. The display control system according to claim 1, wherein the training review is used to create a plurality of partial training reviews.

18. A display control method, comprising:

acquiring user characteristics information about characteristics of a user based on a user review, which is a review posted by the user, and a learning model in which learning has been executed based on a training review, the training review being a review for training;

wherein the learning is executed based on a cluster to which a partial training review belongs, the partial training review being a part of the training review, acquiring, based on the user review and the learning model, the user characteristics information about the cluster that depends on the user review;

selecting, based on the user characteristics information, from among text contents which are contents including a letter, partial text contents which are a part of the text contents, without requiring text input from the user; and displaying the text contents on a display in a manner that makes the partial text contents visually distinguishable.

19. A non-transitory information storage medium having stored thereon a program for causing a computer to:

acquire user characteristics information about characteristics of a user based on a user review, which is a review posted by the user, and a learning model in which learning has been executed based on a training review, the training review being a review for training;

wherein the learning is executed based on a cluster to which a partial training review belongs, the partial training review being a part of the training review, acquire, based on the user review and the learning model, the user characteristics information about the cluster that depends on the user review;

select, based on the user characteristics information, from among text contents which are contents including a letter, partial text contents which are a part of the text contents, without requiring text input from the user; and display the text contents on a display in a manner that makes the partial text contents visually distinguishable.

* * * * *